United States Patent
Lyu et al.

(10) Patent No.: US 12,369,066 B2
(45) Date of Patent: Jul. 22, 2025

(54) WIRELESS APPARATUS AND COMMUNICATION METHOD FOR FLEXIBLE RADIO FREQUENCY CHAIN CONFIGURATIONS

(71) Applicant: HUAWEI TECHNOLOGIES CO., LTD., Guangdong (CN)

(72) Inventors: Yongxia Lyu, Guangdong (CN); Jianglei Ma, Kanata (CA); Liqing Zhang, Kanata (CA); Ting Wang, Guangdong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 18/488,014

(22) Filed: Oct. 16, 2023

(65) Prior Publication Data
US 2024/0049037 A1 Feb. 8, 2024

Related U.S. Application Data

(63) Continuation of application No. PCT/CN2021/094075, filed on May 17, 2021.

(51) Int. Cl.
| | | |
|---|---|---|
| *H04W 28/02* | (2009.01) | |
| *H04B 7/0456* | (2017.01) | |
| *H04W 28/20* | (2009.01) | |

(52) U.S. Cl.
CPC ...... *H04W 28/0215* (2013.01); *H04B 7/0456* (2013.01); *H04W 28/20* (2013.01)

(58) Field of Classification Search
CPC ............ H04W 28/0215; H04W 28/20; H04W 28/22; H04W 28/18; H04B 7/0456; H04B 7/046; H04B 7/0465; H04B 7/0469; H04B 7/0473
See application file for complete search history.

(56) References Cited

U.S. PATENT DOCUMENTS

| | | | |
|---|---|---|---|
| 2009/0117859 A1* | 5/2009 | Smith | H04B 7/12 455/101 |
| 2020/0037383 A1* | 1/2020 | Rico Alvarino | H04W 72/0453 |
| 2021/0013632 A1* | 1/2021 | Lee | H01Q 21/065 |
| 2023/0361819 A1* | 11/2023 | Sridharan | H04B 7/0456 |

* cited by examiner

*Primary Examiner* — Khanh C Tran

(57) ABSTRACT

Current signaling structures in Long-Term Evolution and New Radio are not designed to accommodate flexible allocation of RF chains and/or antennas among radio access technologies (RATs) and/or between different transmission modes that support multiple transmissions/receptions/component carriers such as carrier aggregation, multiple-input multiple-output and/or multiple-transmit-receive point transmission/reception. Embodiments are disclosed in which an apparatus reports radio frequency (RF) capability information that supports such a flexible allocation of RF chains and/or antennas. In some embodiments, the RF capability information includes RF chain information indicating a number of RF chains operable in a first frequency range, and antenna information indicating, for each of a plurality of second frequency ranges within the first frequency range, a number of physical antennas operable within the corresponding second frequency range. A control signaling structure that supports flexible allocation of RF chains and/or antennas for a multi-RAT capable apparatus is also disclosed.

20 Claims, 13 Drawing Sheets

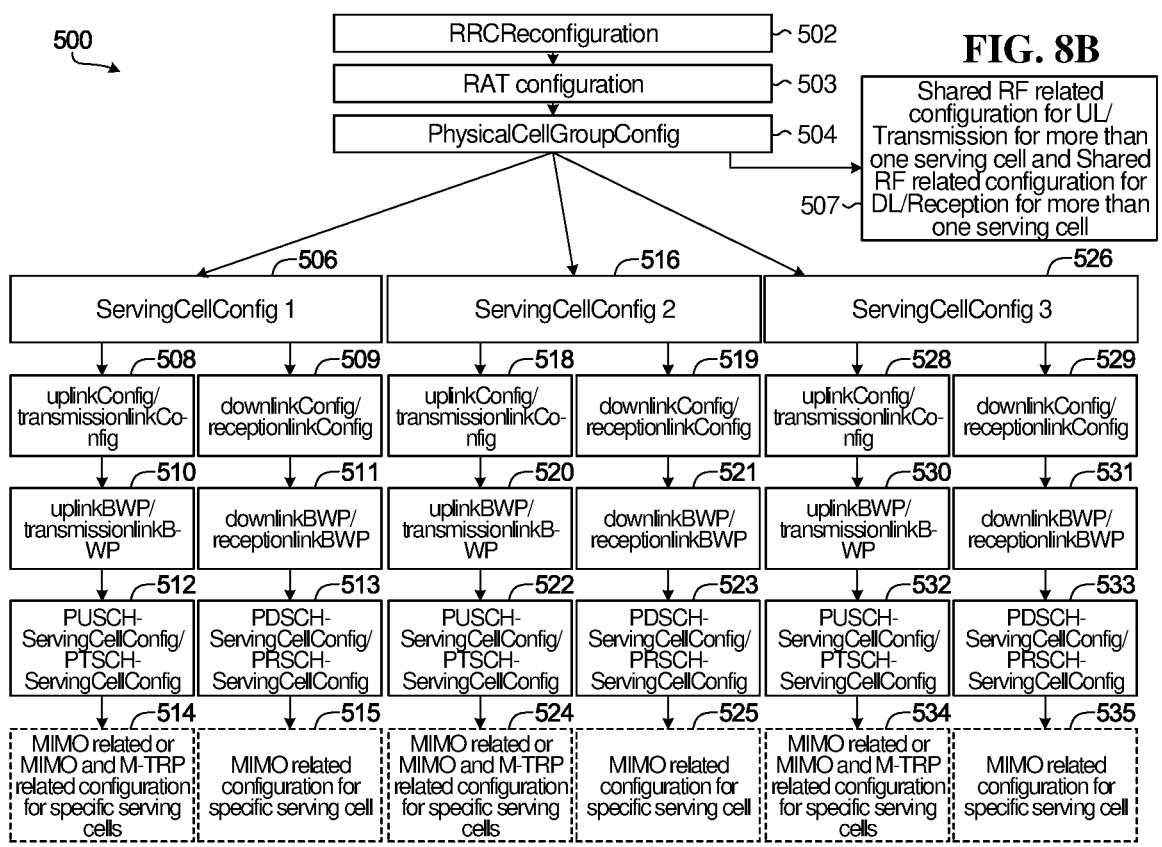

WIRELESS APPARATUS AND COMMUNICATION METHOD FOR FLEXIBLE RADIO FREQUENCY CHAIN CONFIGURATIONS

CROSS-REFERENCE TO RELATED APPLICATION

This application is related to, and is a continuation of, International Application No. PCT/CN2021/094075, filed on May 17, 2021, and entitled "WIRELESS APPARATUS AND COMMUNICATION METHOD FOR FLEXIBLE RADIO FREQUENCY CHAIN CONFIGURATIONS", the entire contents of which are incorporated herein by reference.

FIELD

The present disclosure relates to wireless communication generally, and, in particular embodiments, to methods and apparatuses for configuring flexible radio frequency chains.

BACKGROUND

A number of radio access technologies (RATs) have been developed over time to address the ever-growing demand for increased network coverage, capacity and bandwidth for voice and data services in wireless communication systems. For example, within the Third Generation Partnership Project (3GPP), there have been a number of "generations" of RATs. Recent examples of such RATs in the 3GPP include, but are not limited to, Second Generation (2G) Global system for mobile communication (GSM), Third generation (3G) Wideband Code Division Multiple Access/Time Division-Synchronous Code Division Multiple Access (WCDMA/TDSCDMA), Fourth generation (4G) Long Term Evolution (LTE), and Fifth generation (5G) New Radio (NR). Sixth generation (6G) will be included in the future.

LTE, NR and 6G deployments may have overlapping coverage areas and Multi-RAT capable devices, for example, supporting both LTE, NR and 6G may be widely used.

However, current capability and control signaling structures in LTE and NR do not accommodate flexible allocation of radio frequency (RF) chains and/or antennas among RATs and/or between different transmission modes that support multiple transmissions/receptions/component carriers such as carrier aggregation, multiple-input multiple-output and/or multiple-point transmission/reception.

SUMMARY

According to a first broad aspect of the present disclosure, there is provided herein a method performed by an apparatus (e.g., a user equipment). The apparatus may support a plurality of radio access technologies (RATs) and may include a plurality of radio frequency (RF) transmitter chains and a plurality of physical antennas. The method may include transmitting RF capability information that includes RF transmitter chain information indicating a number of RF transmitter chains of the apparatus operable in a first frequency range. In some embodiments, the RF capability information may further include antenna information indicating, for each second frequency range of a plurality of second frequency ranges within the first frequency range, a number of physical antennas, among the plurality of physical antennas of the apparatus, operable for transmission within the corresponding second frequency range.

By applying the concepts disclosed herein, apparatus cost can potentially be reduced by sharing/reusing RF chains so that not every RAT has a dedicated set of RF chain(s) and/or a dedicated set of physical antenna(s). Moreover, in some embodiments, if the apparatus' RF capability information indicates the apparatus can support different multi-transmission modes (e.g., carrier aggregation transmission, multiple-input multiple-output transmission, etc.), an apparatus' perceived throughput and system throughput can potentially be balanced by dynamically switching the configuration of the apparatus between different multi-transmission modes that provide different levels of apparatus perceived throughput and overall system throughput. For example, the dynamic switching may be controlled by a network device that has received the RF capability information for the apparatus.

In some embodiments, the RF capability information may further include RF receiver chain information indicating a number of RF receiver chains of the apparatus operable in a third frequency range. In such embodiments, the antenna information may further indicate, for each fourth frequency range of a plurality of fourth frequency ranges within the third frequency range, a number of physical antennas, among the plurality of physical antennas of the apparatus, operable for receiving within the corresponding fourth frequency range.

In some embodiments, the RF transmitter chain information indicates a total number of RF transmitter chains of the apparatus that are operable in the first frequency range. By sharing RF transmitter chains between multiple RATs and making the network aware of the total number of RF transmitter chains that are operable in the first frequency range, the cost for an apparatus can potentially be reduced compared to an implementation in which each RAT has a dedicated set of one or more RF transmitter chains.

In some embodiments, the RF transmitter chain information indicates a total number of RF transmitter chains of the apparatus that are operable in the first frequency range per RAT.

In some embodiments, the RF transmitter chains included in the total number of RF transmitter chains of the apparatus that are operable in the first frequency range are shared among the plurality of RATs supported by the apparatus, such that one or more of the RF transmitter chains included in the total number of RF transmitter chains is selectively operable for use in generating transmissions in accordance with two or more of the RATs.

In some embodiments, the method further includes receiving first control signaling, wherein the first control signaling comprises RAT-specific configuration information for a first RAT of the plurality of RATs supported by the apparatus, the RAT-specific configuration information for the first RAT indicating at least one of the following: a number of component carriers (CCs) and a maximum number of transmitting multiple-input multiple-output (MIMO) layers and/or receiving MIMO layers per CC within a physical cell group for the first RAT; a shared maximum number of transmitting multiple-input multiple-output (MIMO) layers and/or receiving MIMO layers for some or all the serving cells within a physical cell group for the first RAT; a shared number of RF transmitter chains and/or a shared number of RF receiver chains for some or all the serving cells within a physical cell group for the first RAT.

In some embodiments, the method further includes configuring the apparatus for transmission in accordance with the first control signaling.

In some embodiments, the RAT-specific configuration information for the first RAT indicates any one of the following: the shared maximum number of transmitting MIMO layers and/or receiving MIMO layers for some or all the serving cells within the physical cell group for the first RAT; the shared number of RF transmitter chain and/or the shared number of RF receiver chain for some or all the serving cells within the physical cell group for the first RAT.

In such embodiments, the RAT-specific configuration information for the first RAT may further include serving cell-specific configuration information for a serving cell within the physical cell group for the first RAT. For example, the serving cell-specific configuration information may indicate a maximum number of transmitting MIMO layers and/or receiving MIMO layers for the serving cell.

In some embodiments, the first control signaling further includes RAT-specific configuration information for a second RAT of the plurality of RATs supported by the apparatus. For example, the RAT-specific configuration information for the second RAT may indicate at least one of the following: a number of CCs and a maximum number of transmitting MIMO layers and/or receiving MIMO layers per CC within a physical cell group for the second RAT; a shared maximum number of transmitting MIMO layers and/or receiving MIMO layers for some or all the serving cells within a physical cell group for the second RAT; a shared number of RF transmitter chain and/or a shared number of RF receiver chain for some or all the serving cells within a physical cell group for the second RAT. This can allow the first control signaling to allocate RF transmitter chains, RF receiver chains and/or physical antennas of the apparatus between the first and second RATs.

In some embodiments, the method may further include receiving second control signaling allocating a shared number of RF transmitter chains and/or a shared number of RF receiver chains for some or all the serving cells within a physical cell group for the first RAT to perform any one or more of: carrier aggregation (CA) transmission; multiple-input multiple-output (MIMO) transmission; or multiple-transmit receive point (M-TRP) transmission.

In such embodiments, the second control signaling may configure the apparatus to switch the one or more RF transmitter chains and/or the one or more physical antennas at least from any one of: CA transmission to MIMO transmission; MIMO transmission to CA transmission; CA transmission to M-TRP transmission; M-TRP transmission to CA transmission; MIMO transmission to M-TRP transmission; or M-TRP transmission to MIMO transmission.

By dynamically switching the apparatus between different multi-transmission modes that provide different levels of apparatus perceived throughput and overall system throughput, e.g., by dynamically switching the apparatus between UL CA and UL MIMO/M-TRPs, the device can balance the apparatus' needs for higher perceived throughput at certain times against the goal of generally providing higher overall system throughput.

In some embodiments, the first control signaling may be one of radio resource control (RRC) signaling or medium access control (MAC) signaling.

In some embodiments, the second control signaling may be one of physical layer signaling or MAC signaling.

In some embodiments, the RF transmitter chain information may include RAT-specific RF transmitter chain information that, for one or more RATs of the plurality of RATs supported by the apparatus, indicates a number of RF transmitter chains of the apparatus operable for transmission in accordance with the corresponding RAT in the first frequency range. In such embodiments, the antenna information may include RAT-specific transmitter antenna information that, for one or more RATs of the plurality of RATs supported by the apparatus, indicates, for one or more of the second frequency ranges within the first frequency range, a number of physical antennas, among the plurality of physical antennas of the apparatus, operable for transmission in accordance with the corresponding RAT within the corresponding second frequency range.

In some embodiments, the RF receiver chain information may include RAT-specific RF receiver chain information that, for one or more RATs of the plurality of RATs supported by the apparatus, indicates a number of RF receiver chains of the apparatus operable for receiving in accordance with the corresponding RAT in the third frequency range. In such embodiments, the antenna information may include RAT-specific receiver antenna information that, for one or more RATs of the plurality of RATs supported by the apparatus, indicates, for one or more of the fourth frequency ranges within the third frequency range, a number of physical antennas operable for receiving in accordance with the corresponding RAT within the corresponding fourth frequency range.

According to a second broad aspect of the present disclosure, there is provided herein a corresponding method performed by a device that may include receiving, from the apparatus, RF capability information that includes RF transmitter chain information indicating a number of RF transmitter chains of the apparatus operable in a first frequency range. In some embodiments, the RF capability information further includes antenna information indicating, for each second frequency range of a plurality of second frequency ranges within the first frequency range, a number of physical antennas operable for transmission within the corresponding second frequency range. In some embodiments, the device also transmits, to the apparatus, first control signaling configuring the RF transmitter chains of the apparatus and/or the physical antennas of the apparatus.

In some embodiments, the device transmits second control signaling to the apparatus. For example, the second control signaling may allocate a shared number of RF transmitter chains and/or a shared number of RF receiver chains for some or all the serving cells within a physical cell group for the first RAT to perform any one or more of: CA transmission; MIMO transmission; or M-TRP transmission.

Corresponding apparatuses and devices are disclosed for performing the methods.

For example, according to another aspect of the disclosure, an apparatus is provided that supports multiple RATs and includes multiple RF transmitter chains, multiple physical antennas, a processor and a memory storing processor-executable instructions that, when executed, cause the processor to carry out a method according to the first broad aspect of the present disclosure described above.

According to another aspect of the disclosure, a device is provided that includes a processor and a memory storing processor-executable instructions that, when executed, cause the processor to carry out a method according to the second broad aspect of the present disclosure described above.

According to other aspects of the disclosure, an apparatus including one or more units for implementing any of the method aspects as disclosed in this disclosure is provided. The term "units" is used in a broad sense and may be referred to by any of various names, including for example, modules, components, elements, means, etc. The units can be implemented using hardware, software, firmware or any combination thereof.

BRIEF DESCRIPTION OF THE DRAWINGS

Reference will now be made, by way of example only, to the accompanying drawings which show example embodiments of the present application, and in which:

FIG. 8B illustrates another example of an RRC signaling structure that supports a semi-static allocation of RF chains and/or antennas among multiple RATs and a dynamic allocation of RF chains and/or antennas between different transmission modes supporting multiple TXs/CCs, according to one embodiment;

Similar reference numerals may have been used in different figures to denote similar components.

DESCRIPTION OF EXAMPLE EMBODIMENTS

For illustrative purposes, specific example embodiments will now be explained in greater detail below in conjunction with the figures.

Example Communication Systems and Devices

Figure 1:
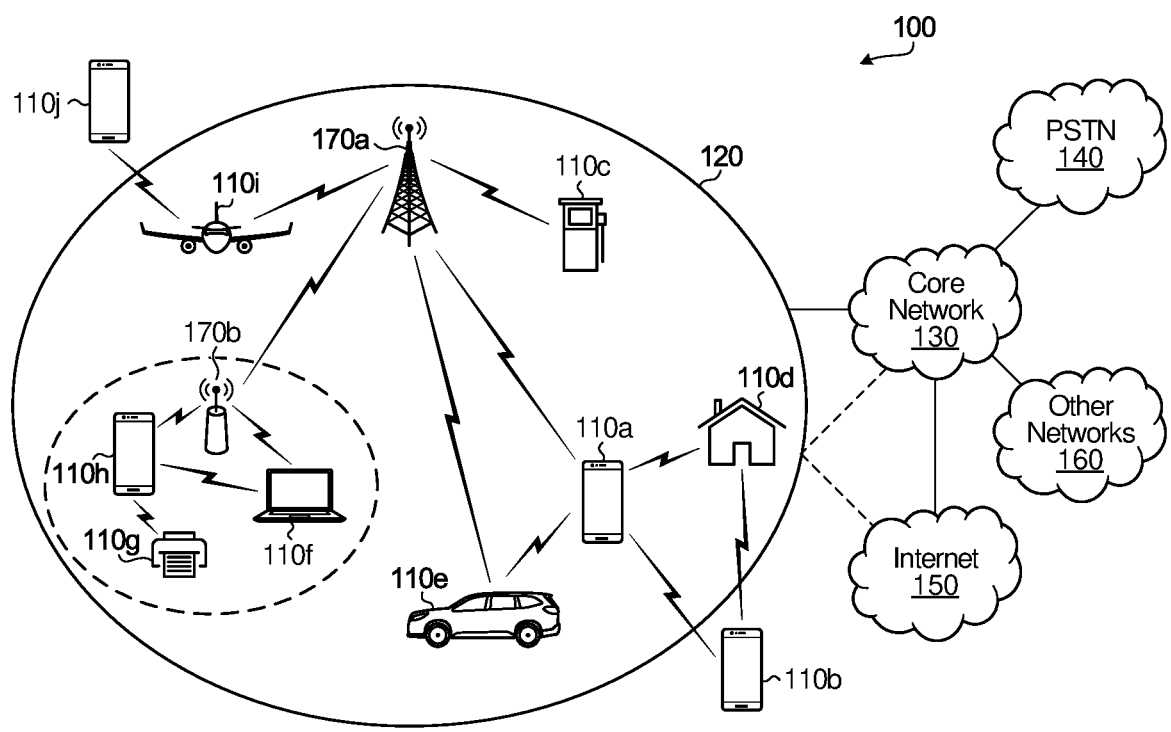
FIG. 1 is a simplified schematic illustration of a communication system, according to one example.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another or connected to one or more network nodes (170a, 170b, generically referred to as 170) in the radio access network 120. A core network 130 may be a part of the communication system and may be dependent or independent of the radio access technology used in the communication system 100. Also, the communication system 100 comprises a public switched telephone network (PSTN) 140, the internet 150, and other networks 160.

Figure 2:
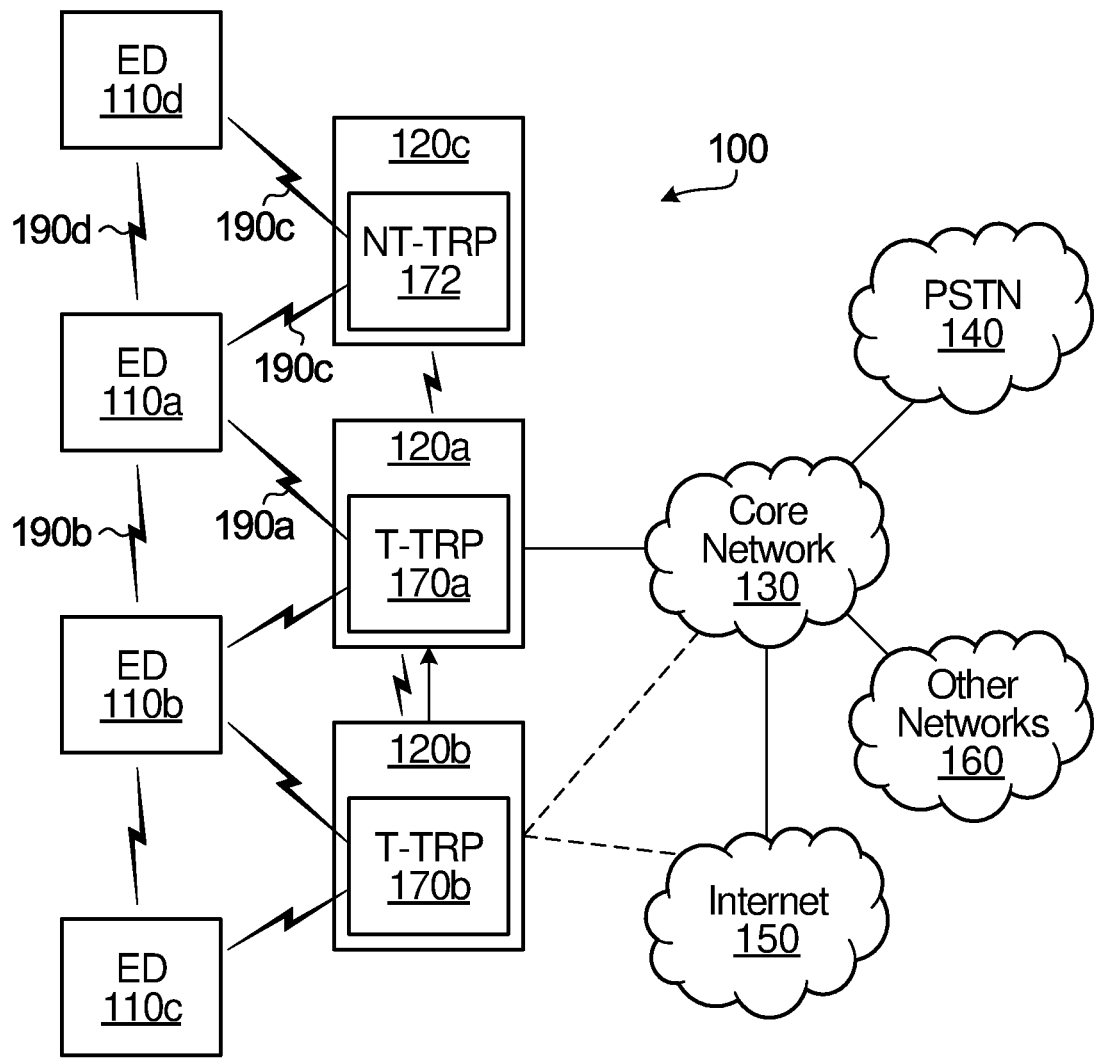
FIG. 2 illustrates another example of a communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies and incorporate multiple transceivers necessary to support such.

Figure 3:
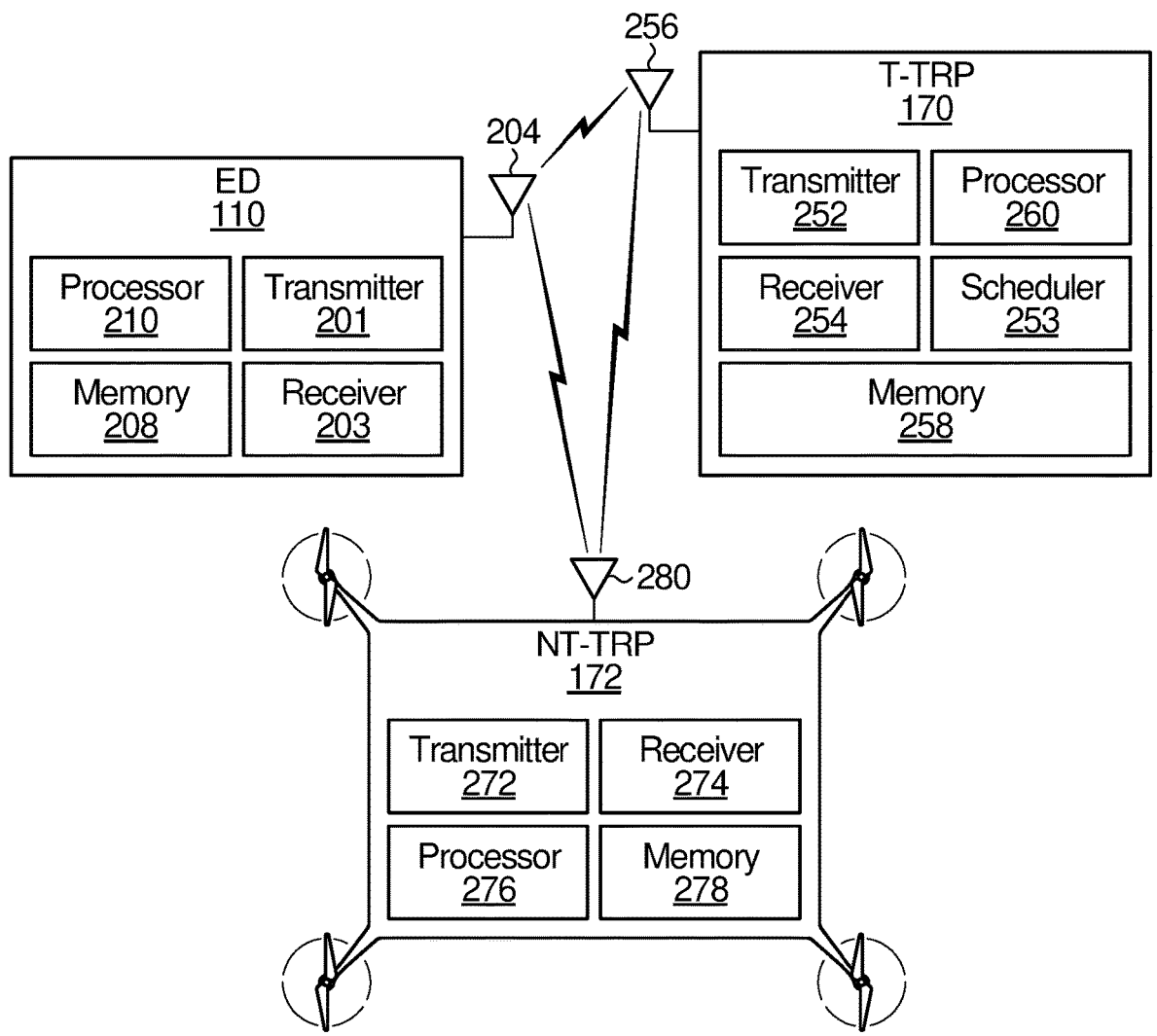
FIG. 3 illustrates an example of an electronic device (ED), a terrestrial transmit and receive point (T-TRP), and a non-terrestrial transmit and receive point (NT-TRP)

FIG. 3 illustrates another example of an ED 110 and a base station 170a, 170b and/or 170c. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170a and 170b is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver.

The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

Note that "TRP", as used herein, may refer to a T-TRP or a NT-TRP.

The T-TRP 170, the NT-TRP 172, and/or the ED 110 may include other components, but these have been omitted for the sake of clarity.

Figure 4:
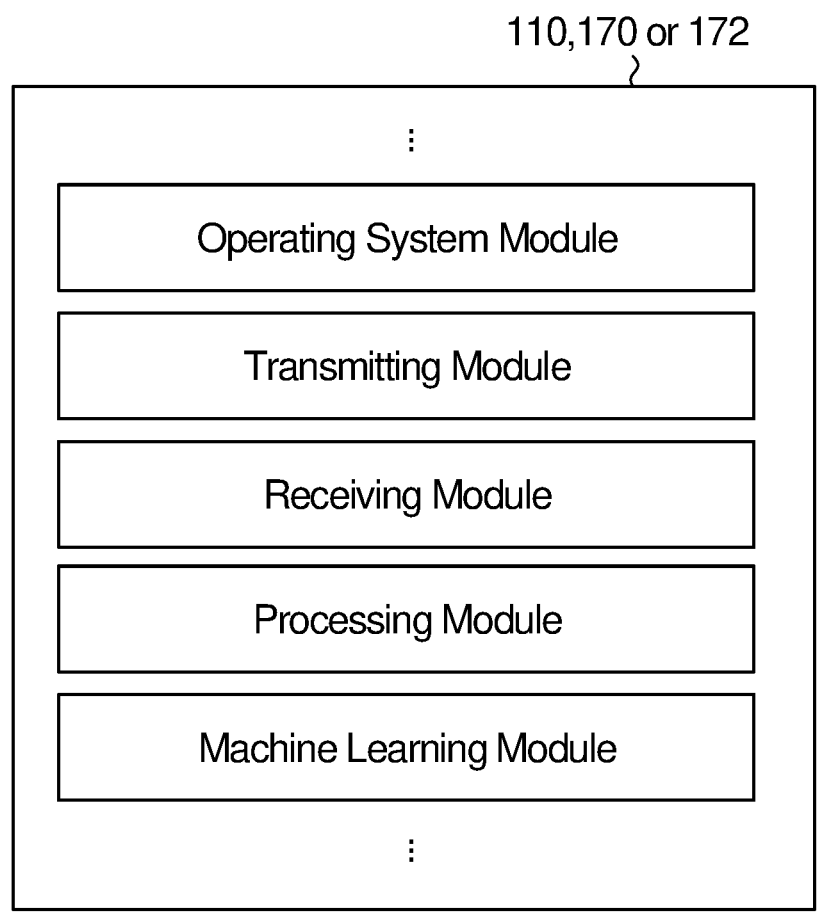
FIG. 4 illustrates example units or modules in a device.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Control signaling is discussed herein in some embodiments. Control signaling may sometimes instead be referred to as signaling, or control information, or configuration information, or a configuration. In some cases, control signaling may be dynamically indicated, e.g. in the physical layer in a control channel. An example of control signaling that is dynamically indicated is information sent in physical layer control signaling, e.g. downlink control information (DCI). Control signaling may sometimes instead be semi-statically indicated, e.g. in RRC signaling or in a MAC control element (CE). A dynamic indication may be an indication in lower layer, e.g. physical layer/layer 1 signaling (e.g. in DCI), rather than in a higher-layer (e.g. rather than in RRC signaling or in a MAC CE). A semi-static indication may be an indication in semi-static signaling. Semi-static signaling, as used herein, may refer to signaling that is not dynamic, e.g. higher-layer signaling, RRC signaling, and/or a MAC CE. Dynamic signaling, as used herein, may refer to signaling that is dynamic, e.g. physical layer control signaling sent in the physical layer, such as DCI.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g. data) over a wireless communications link. The wireless communications link may support a link between a radio access network and user equipment (e.g. a "Uu" link), and/or the wireless communications link may support a link between device and device, such as between two user equipments (e.g. a "sidelink"), and/or the wireless communications link may support a link between a non-terrestrial (NT)-communication network and user equipment (UE). The followings are some examples for the above components:

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

A frame structure component may specify a configuration of a frame or group of frames. The frame structure component may indicate one or more of a time, frequency, pilot signature, code, or other parameter of the frame or group of frames. More details of frame structure will be discussed below.

A multiple access scheme component may specify multiple access technique options, including technologies defining how communicating devices share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources, and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission, and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all concept". For example, the components within the air interface cannot be changed or adapted once the air interface is defined. In some implementations, only limited parameters or modes of an air interface, such as a cyclic prefix (CP) length or a multiple input multiple output (MIMO) mode, can be configured. In some embodiments, an air interface design may provide a unified or flexible framework to support below 6 GHz and beyond 6 GHz frequency (e.g., mmWave) bands for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain, and a frequency domain self-contained design may support more flexible radio access network (RAN) slicing through channel resource sharing between different services in both frequency and time.

Frame Structure

A frame structure is a feature of the wireless communication physical layer that defines a time domain signal transmission structure, e.g. to allow for timing reference and timing alignment of basic time domain transmission units. Wireless communication between communicating devices may occur on time-frequency resources governed by a frame structure. The frame structure may sometimes instead be called a radio frame structure.

Depending upon the frame structure and/or configuration of frames in the frame structure, frequency division duplex (FDD) and/or time-division duplex (TDD) and/or full duplex (FD) communication may be possible. FDD communication is when transmissions in different directions (e.g. uplink vs. downlink) occur in different frequency bands. TDD communication is when transmissions in different directions (e.g. uplink vs. downlink) occur over different time durations. FD communication is when transmission and reception occurs on the same time-frequency resource, i.e. a device can both transmit and receive on the same frequency resource concurrently in time.

One example of a frame structure is a frame structure in long-term evolution (LTE) having the following specifications: each frame is 10 ms in duration; each frame has 10 subframes, which are each 1 ms in duration; each subframe includes two slots, each of which is 0.5 ms in duration; each slot is for transmission of 7 OFDM symbols (assuming normal CP); each OFDM symbol has a symbol duration and a particular bandwidth (or partial bandwidth or bandwidth partition) related to the number of subcarriers and subcarrier spacing; the frame structure is based on OFDM waveform parameters such as subcarrier spacing and CP length (where the CP has a fixed length or limited length options); and the switching gap between uplink and downlink in TDD has to be the integer time of OFDM symbol duration.

Another example of a frame structure is a frame structure in new radio (NR) having the following specifications: multiple subcarrier spacings are supported, each subcarrier spacing corresponding to a respective numerology; the frame structure depends on the numerology, but in any case the frame length is set at 10 ms, and consists of ten subframes of 1 ms each; a slot is defined as 14 OFDM symbols, and slot length depends upon the numerology. For example, the NR frame structure for normal CP 15 kHz subcarrier spacing ("numerology 1") and the NR frame structure for normal CP 30 kHz subcarrier spacing ("numerology 2") are different. For 15 kHz subcarrier spacing a slot length is 1 ms, and for 30 kHz subcarrier spacing a slot length is 0.5 ms. The NR frame structure may have more flexibility than the LTE frame structure.

Another example of a frame structure is an example flexible frame structure, e.g. for use in a 6G network or later. In a flexible frame structure, a symbol block may be defined as the minimum duration of time that may be scheduled in the flexible frame structure. A symbol block may be a unit of transmission having an optional redundancy portion (e.g. CP portion) and an information (e.g. data) portion. An OFDM symbol is an example of a symbol block. A symbol block may alternatively be called a symbol. Embodiments of flexible frame structures include different parameters that may be configurable, e.g. frame length, subframe length, symbol block length, etc. A non-exhaustive list of possible configurable parameters in some embodiments of a flexible frame structure include:

(1) Frame: The frame length need not be limited to 10 ms, and the frame length may be configurable and change over time. In some embodiments, each frame includes one or multiple downlink synchronization channels and/or one or multiple downlink broadcast channels, and each synchronization channel and/or broadcast channel may be transmitted in a different direction by different beamforming. The frame length may be more than one possible value and configured based on the application scenario. For example, autonomous vehicles may require relatively fast initial access, in which case the frame length may be set as 5 ms for autonomous vehicle applications. As another example, smart meters on houses may not require fast initial access, in which case the frame length may be set as 20 ms for smart meter applications.

(2) Subframe duration: A subframe might or might not be defined in the flexible frame structure, depending upon the implementation. For example, a frame may be defined to include slots, but no subframes. In frames in which a subframe is defined, e.g. for time domain alignment, then the duration of the subframe may be configurable. For example, a subframe may be configured to have a length of 0.1 ms or 0.2 ms or 0.5 ms or 1 ms or 2 ms or 5 ms, etc. In some embodiments, if a subframe is not needed in a particular scenario, then the subframe length may be defined to be the same as the frame length or not defined.

(3) Slot configuration: A slot might or might not be defined in the flexible frame structure, depending upon the implementation. In frames in which a slot is defined, then the definition of a slot (e.g. in time duration and/or in number of symbol blocks) may be configurable. In one embodiment, the slot configuration is common to all UEs or a group of UEs. For this case, the slot configuration information may be transmitted to UEs in a broadcast channel or common control channel(s). In other embodiments, the slot configuration may be UE specific, in which case the slot configuration information may be transmitted in a UE-specific control channel. In some embodiments, the slot configuration signaling can be transmitted together with frame configuration signaling and/or subframe configuration signaling. In other embodiments, the slot configuration can be transmitted independently from the frame configuration signaling and/or subframe configuration signaling. In general, the slot configuration may be system common, base station common, UE group common, or UE specific.

(4) Subcarrier spacing (SCS): SCS is one parameter of scalable numerology which may allow the SCS to possibly range from 15 KHz to 480 KHz. The SCS may vary with the frequency of the spectrum and/or maximum UE speed to minimize the impact of the Doppler shift and phase noise. In some examples, there may be separate transmission and reception frames, and the SCS of symbols in the reception frame structure may be configured independently from the SCS of symbols in the transmission frame structure. The SCS in a reception frame may be different from the SCS in a transmission frame. In some examples, the SCS of each transmission frame may be half the SCS of each reception frame. If the SCS between a reception frame and a transmission frame is different, the difference does not necessarily have to scale by a factor of two, e.g. if more flexible symbol durations are implemented using inverse discrete Fourier transform (IDFT) instead of fast Fourier transform (FFT). Additional examples of frame structures can be used with different SCSs.

(5) Flexible transmission duration of basic transmission unit: The basic transmission unit may be a symbol block (alternatively called a symbol), which in general includes a redundancy portion (referred to as the CP) and an information (e.g. data) portion, although in some embodiments the CP may be omitted from the symbol block. The CP length may be flexible and configurable. The CP length may be fixed within a frame or flexible within a frame, and the CP length may possibly change from one frame to another, or from one group of frames to another group of frames, or from one subframe to another subframe, or from one slot to another slot, or dynamically from one scheduling to another scheduling. The information (e.g. data) portion may be flexible and configurable. Another possible parameter relating to a symbol block that may be defined is ratio of CP duration to information (e.g. data) duration. In some embodiments, the symbol block length may be adjusted according to: channel condition (e.g. multi-path delay, Doppler); and/or latency requirement; and/or available time duration. As another example, a symbol block length may be adjusted to fit an available time duration in the frame.

(6) Flexible switch gap: A frame may include both a downlink portion for downlink transmissions from a base station, and an uplink portion for uplink transmissions from UEs. A gap may be present between each uplink and downlink portion, which is referred to as a switching gap. The switching gap length (duration) may be configurable. A switching gap duration may be fixed within a frame or flexible within a frame, and a switching gap duration may possibly change from one frame to another, or from one group of frames to another group of frames, or from one subframe to another subframe, or from one slot to another slot, or dynamically from one scheduling to another scheduling.

Cell/Carrier/Bandwidth Parts (BWPs)/Occupied Bandwidth

A device, such as a base station, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g. the center or lowest or highest frequency of the carrier. A carrier may be on licensed or unlicensed spectrum. Wireless communication with the device may also or instead occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g. a carrier may have a bandwidth of 20 MHz and consist of one BWP, or a carrier may have a bandwidth of 80 MHz and consist of two adjacent contiguous BWPs, etc. In other embodiments, a BWP may have one or more carriers, e.g. a BWP may have a bandwidth of 40 MHz and consists of two adjacent contiguous carriers, where each carrier has a bandwidth of 20 MHz. In some embodiments, a BWP may comprise non-contiguous spectrum resources which consists of non-contiguous multiple carriers, where the first carrier of the non-contiguous multiple carriers may be in mmW band, the second carrier may be in a low band (such as 2 GHz band), the third carrier (if it exists) may be in THz band, and the fourth carrier (if it exists) may be in visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits, the mean powers emitted are each equal to a specified percentage □/2 of the total mean transmitted power, for example, the value of □/2 is taken as 0.5%.

The carrier, the BWP, or the occupied bandwidth may be signaled by a network device (e.g. base station) dynamically, e.g. in physical layer control signaling such as Downlink Control Information (DCI), or semi-statically, e.g. in radio resource control (RRC) signaling or in the medium access control (MAC) layer, or be predefined based on the application scenario; or be determined by the UE as a function of other parameters that are known by the UE, or may be fixed, e.g. by a standard.

Artificial Intelligence (AI) and/or Machine Learning (ML)

The number of new devices in future wireless networks is expected to increase exponentially and the functionalities of the devices are expected to become increasingly diverse. Also, many new applications and use cases are expected to emerge with more diverse quality of service demands than those of 5G applications/use cases. These will result in new key performance indications (KPIs) for future wireless networks (for example, a 6G network) that can be extremely challenging. AI technologies, such as ML technologies (e.g., deep learning), have been introduced to telecommunication applications with the goal of improving system performance and efficiency.

In addition, advances continue to be made in antenna and bandwidth capabilities, thereby allowing for possibly more and/or better communication over a wireless link. Additionally, advances continue in the field of computer architecture and computational power, e.g. with the introduction of general-purpose graphics processing units (GP-GPUs). Future generations of communication devices may have more computational and/or communication ability than previous generations, which may allow for the adoption of AI for implementing air interface components. Future generations of networks may also have access to more accurate and/or new information (compared to previous networks) that may form the basis of inputs to AI models, e.g.: the physical speed/velocity at which a device is moving, a link budget of the device, the channel conditions of the device, one or more device capabilities and/or a service type that is to be supported, sensing information, and/or positioning information, etc. To obtain sensing information, a TRP may transmit a signal to target object (e.g. a suspected UE), and based on the reflection of the signal the TRP or another network device computes the angle (for beamforming for the device), the distance of the device from the TRP, and/or doppler shifting information. Positioning information is sometimes referred to as localization, and it may be obtained in a variety of ways, e.g. a positioning report from a UE (such as a report of the UE's GPS coordinates), use of positioning reference signals (PRS), using the sensing described above, tracking and/or predicting the position of the device, etc.

AI technologies (which encompass ML technologies) may be applied in communication, including AI-based communication in the physical layer and/or AI-based communication in the MAC layer. For the physical layer, the AI communication may aim to optimize component design and/or improve the algorithm performance. For example, AI may be applied in relation to the implementation of: channel coding, channel modelling, channel estimation, channel decoding, modulation, demodulation, MIMO, waveform, multiple access, physical layer element parameter optimization and update, beam forming, tracking, sensing, and/or positioning, etc. For the MAC layer, the AI communication may aim to utilize the AI capability for learning, prediction, and/or making a decision to solve a complicated optimization problem with possible better strategy and/or optimal solution, e.g. to optimize the functionality in the MAC layer. For example, AI may be applied to implement: intelligent TRP management, intelligent beam management, intelligent channel resource allocation, intelligent power control, intelligent spectrum utilization, intelligent MCS, intelligent HARQ strategy, and/or intelligent transmission/reception mode adaption, etc.

In some embodiments, an AI architecture may involve multiple nodes, where the multiple nodes may possibly be organized in one of two modes, i.e., centralized and distributed, both of which may be deployed in an access network, a core network, or an edge computing system or third party network. A centralized training and computing architecture is restricted by possibly large communication overhead and strict user data privacy. A distributed training and computing architecture may comprise several frameworks, e.g., distributed machine learning and federated learning. In some embodiments, an AI architecture may comprise an intelligent controller which can perform as a single agent or a multi-agent, based on joint optimization or individual optimization. New protocols and signaling mechanisms are desired so that the corresponding interface link can be personalized with customized parameters to meet particular requirements while minimizing signaling overhead and maximizing the whole system spectrum efficiency by personalized AI technologies.

RF Capability Information

A device/UE reports RF capability information to the network in order advise the network of the RF capabilities of the device/UE. In both LTE and NR, the RF capabilities per RAT that are reported by a UE include:

the supported maximum number of layers per CC per band/band combination;

the aggregated transmission bandwidth configuration and maximum number of component carriers per band per band combination as specified in Technical Specification (TS) 36.101 (LTE standard specification) and TS 38.101-1 (NR standard specifications); and the supported NR/LTE frequency band(s) identified by NR/LTE frequency band number, as specified in TS 36.101 (LTE standard specification), TS 38.101-1 and TS 38.101-2 (NR standard specifications):

In 3GPP NR Release 16, the capability of UL Tx switching per band pair is introduced. UL Tx switching per band pair involves dynamically switching uplink transmission between to bands that have been identified as a band pair. In 3GPP NR Release 16, the capability to support UL Tx switching per band pair is indicated by ULTxSwitchingBandPair-r16. In particular, ULTxSwitchingBandPair-r16 in 3GPP TS 38.306 indicates a UE supports dynamic UL Tx switching in case of inter-band carrier aggregation (CA), supplement uplink (SUL), and (NG)EN-DC (E-UTRA NR-dual connectivity) as defined in TS 38.214, TS 38.101-1 and TS 38.101-3. The capability signaling for ULTxSwitchingBandPair-r16 comprises the following parameters:

bandIndexUL1-r16 and bandIndexUL2-r16 indicate the band pair on which UE supports dynamic UL Tx switching. bandindexUL1/bandindexUL2 xx refers to the xxth band entry in the band combination. UE shall indicate support for 2-layer UL MIMO capabilities at least on one of the indicated two bands for UL Tx switching, and only the band where UE supports 2-layer UL MIMO capability can work as carrier2 as defined in TS 38.101-1 and TS 38.101-3.

uplinkTxSwitchingPeriod-r16 indicates the length of UL Tx switching period per pair of UL bands per band combination when dynamic UL Tx switching is configured, as specified in TS 38.101-1 and TS 38.101-3. UE shall not report the value n210 us for EN-DC band combinations. n35 us represents 35 us, n140 us represents 140 us, and so on, as specified in TS 38.101-1 and TS 38.101-3.

uplinkTxSwitching-DL-Interruption-r16 indicates that DL interruption on the band will occur during UL Tx switching, as specified in TS 38.133 and in TS 36.133. UE is not allowed to set this field for the band combination of SUL band+TDD band, for which no DL interruption is allowed. The uplinkTxSwitching-DL-Interruption-r16 field is encoded as a bit map, where bit N is set to "1" if DL interruption on band N will occur during uplink Tx switching as specified in TS 38.133 and in TS 36.133. The leading/leftmost bit (bit 0) corresponds to the first band of this band combination, the next bit corresponds to the second band of this band combination and so on. The capability is not applicable to the following band combinations, in which DL reception interruption is not allowed:
TDD+TDD CA with the same UL-DL pattern
TDD+TDD EN-DC with the same UL-DL pattern In NR and LTE, there are several limitations associated with RF capability reporting provided by UEs and the associated configurations provided by the network based on the RF capability reporting. For example, in NR Release 15 and LTE the maximum number of MIMO layer(s) is bundled with a given CC and the max CC number is bundled with a given band.

The UL Tx switching per band pair capability introduced in 3GPP NR Release 16 relaxes the strict bundling relationship in NR Release 15 and allows a UE to dynamically switch between 2T (two layers) and two carriers, but it can work only when RF capability of UE is reported to support 2 layers UL MIMO on one band. Furthermore, in NR Release 16, only time division multiplexing (TDM) based uplink transmission for multiple transmit-receive points (M-TRPs) is supported because only one transmitter chain on the UE side is assumed.

Figure 5:
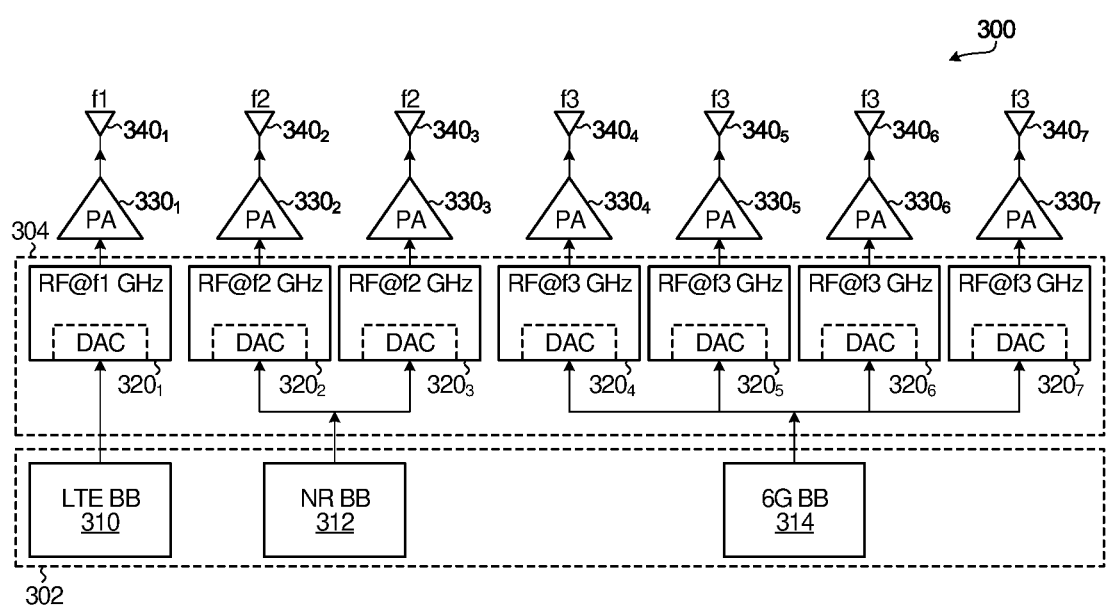
FIG. 5 illustrates an example of a multi-RAT transmitter architecture to support LTE, NR and 6G RATs based on an existing signaling framework in LTE/NR.

FIG. 5 illustrates an example of a multi-RAT transmitter architecture to support LTE, NR and 6G RATs based on an existing signaling framework in LTE/NR. In particular, FIG. 5 shows a multi-RAT transmitter 300 that includes a baseband (BB) portion 302, an RF portion 304, a plurality of power amplifiers 330 and a plurality of physical antennas 340.

The baseband portion 302 includes a baseband module for each of the three supported RATs, namely LTE BB module 310, NR BB module 312 and 6G BB module 314. Each of the BB modules provides baseband signal processing for the corresponding RAT.

The RF portion 304 includes seven RF modules $320_1$, $320_2$, $320_3$, $320_4$, $320_5$, $320_6$ and $320_7$. The RF module $330_1$ is operably connected to obtain BB signals from LTE BB module 310. The RF modules $320_2$ and $320_3$ are operably connected to obtain BB signals from NR module 312. The RF modules $320_4$, $320_5$, $320_6$ and $320_7$ are operably connected to obtain BB signals from 6G BB module 314.

The plurality of power amplifiers 330 includes seven power amplifiers $330_1$, $330_2$, $330_3$, $330_4$, $330_5$, $330_6$ and $330_7$, each of which is operably connected to obtain RF signals from a corresponding one of the seven RF modules $320_1$, $320_2$, $320_3$, $320_4$, $320_5$, $320_6$ and $320_7$.

The plurality of physical antennas 340 likewise includes seven physical antennas $340_1$, $340_2$, $340_3$, $340_4$, $340_5$, $340_6$ and $340_7$, each of which is operably connected to obtain RF signals from a corresponding one of the seven power amplifiers $330_1$, $330_2$, $330_3$, $330_4$, $330_5$, $330_6$ and $330_7$.

The antenna(s), power amplifier(s) and RF module(s) for each RAT are configured for a particular frequency band. For example, RF module $320_1$, power amplifier $330_1$ and physical antenna $340_1$ are configured for operation in a first frequency band f1 for LTE. Similarly, RF modules $320_2$ and $320_3$, power amplifier $330_2$ and $330_3$ and physical antenna $340_2$ and $340_3$ are configured for operation in a second frequency band f2 for NR, and RF modules $320_4$, $320_5$, $320_6$ and $320_7$, power amplifier $330_4$, $330_5$, $330_6$ and $330_7$ and physical antenna $340_4$, $340_5$, $340_6$ and $340_7$ are configured for operation in a third frequency band f3 for 6G.

In operation, the baseband module for each RAT, e.g., LTE BB module 310, NR BB module 312 and 6G BB module 314, generates digital baseband signaling for the corresponding RAT. The digital baseband signaling is processed by the corresponding RF module(s) 320 to generate analog RF signals, which are in turn amplified by the corresponding power amplifier(s) 330 and then transmitted via the corresponding antenna(s) 340.

The RF modules 320 include signal processing functions needed to convert digital baseband signals into RF signals that are ready for amplification and transmission. Such signal processing functions may include digital to analog conversion (DAC), baseband to intermediate frequency (IF) conversion, IF to RF conversion, for example.

Each RF module 320 and the power amplifier 330 that it is operably connected to functions as an RF transmitter chain that obtains baseband digital signals and generates corresponding RF signals ready for transmission via the physical antenna 340 operably connected to the output of the power amplifier.

However, the current capability signaling structure for RF capability (at least including MIMO and carrier aggregation) in LTE and NR has enforced strong restriction on utilization of frequency resource (bandwidth configuration and CC number) and spatial domain resource (the number of MIMO layers) based on the assumption that each transmitter chain is bundled with certain carrier component or band. For example, referring to FIG. 5, it can be seen that the antennas for NR, which includes antennas $340_2$ and $340_3$, and the transmitter chain for NR, which includes RF modules $320_2$ and $320_3$ and power amplifiers $330_2$ and $330_3$ and antennas $340_2$ and $340_3$, are bundled with (or limited to) the second frequency band f2.

These kinds of restrictions on RF capability may have been reasonable in the past given the practical hardware limitations imposed by the past manufacturing capabilities for radio frequency (RF) technologies. However, as it become feasible to digitize and integrate more modules in the RF portion of a device/UE on chip, it is desirable to provide RF capabilities and associated control signaling that exploit the opportunities provided by the increased digitization/integration of RF components/modules. For example, it is expected that the power amplifier, which is one of the main modules in each transmitter chain in current commercial UE/devices, will be digitized and integrated into a RoC (Radio on Chip) implementation with the other RF signal processing functions.

However, the current RF capability structure in LTE and NR does not match or support the expected RF capabilities of an evolved ROC that includes a digitized PA that is capable of switching between different bands, and would therefore enforce unnecessary restrictions on the utilization of frequency resource and spatial domain resource that may otherwise be possible with such an evolved ROC, e.g., the dynamic sharing of transmitter chains among MIMO, carrier aggregation, M-TRPs, and different RATs.

The present disclosure provides new signaling frameworks that support the flexible allocation of RF chains to support dynamically shared RF chains among MIMO, M-TRPs, CA, and/or between different RATs.

For example, in order to potentially reduce 6G UE costs and improve UE perceived throughput, the present disclosure provides new RF capabilities for 6G that make it possible to take advantage of reusing some transmitter chain(s) of other RATs (for example, LTE/NR) to support UL MIMO/CA/M-TRP transmission(s) for 6G. Moreover, the present disclosure provides new signaling structures to support the sharing of RF chains/antenna(s) between different RATs and/or between UL MIMO and CA, or between UL-MIMO and M-TRP transmission(s), or between CA and M-TRP transmissions in the same RAT.

New RF Capabilities Reported by UE

According to a first aspect of the present disclosure, an apparatus reports RF capability information that supports a flexible allocation of RF chains and/or antennas among RATs and/or between different transmission modes that support multiple transmissions/receptions/component carriers such as CA, MIMO and/or M-TRP transmission/reception. In some embodiments, the RF capability information includes RF chain information indicating a number of RF chains operable in a first frequency range, and antenna information indicating, for each of a plurality of second frequency ranges within the first frequency range, a number of physical antennas operable within the corresponding second frequency range. A control signaling structure that supports flexible allocation of RF chains and/or antennas for a multi-RAT capable apparatus is also disclosed.

For example, in one embodiment, an apparatus may report RF capability information comprising:

RF transmitter chain information indicating the number of RF transmitter chains for a large first frequency range; and Antenna information indicating the number of physical antenna(s) per narrow second frequency range with the large first frequency range.

For example, the large first frequency range may be FR1 or FR2 as defined in Table 5.1-1 of TS 38.101-1, which is reproduced below.

| Frequency range designation | Corresponding frequency range |
| --- | --- |
| FR1 | 410 MHz-7125 MHz |
| FR2 | 24250 MHz-52600 MHz |

More generally, the large first frequency range may be any frequency range that an RF transmitter chain (e.g., including PA, DAC, IF etc, not including antennas) can switch within or work within.

In some embodiments, the number of RF transmitter chains reported by a UE or other apparatus are shared among multiple RATs that the UE or other apparatus supports, e.g., LTE, NR, 6G etc., in the first large frequency range.

The narrow second frequency ranges within the large first frequency range may be the operating bands or band combinations as defined in TS 38.101-1 or TS 36.101, for example. More generally, the narrow second frequency ranges may be any frequency range a physical antenna is operable to work for, i.e., in which the antenna is operable to meet given performance requirements. For example, a second narrow frequency range may be defined as the frequency range for sharing the same antenna(s), which may be different from the defined band combination for CA/DC in LTE and NR.

Figure 6A:
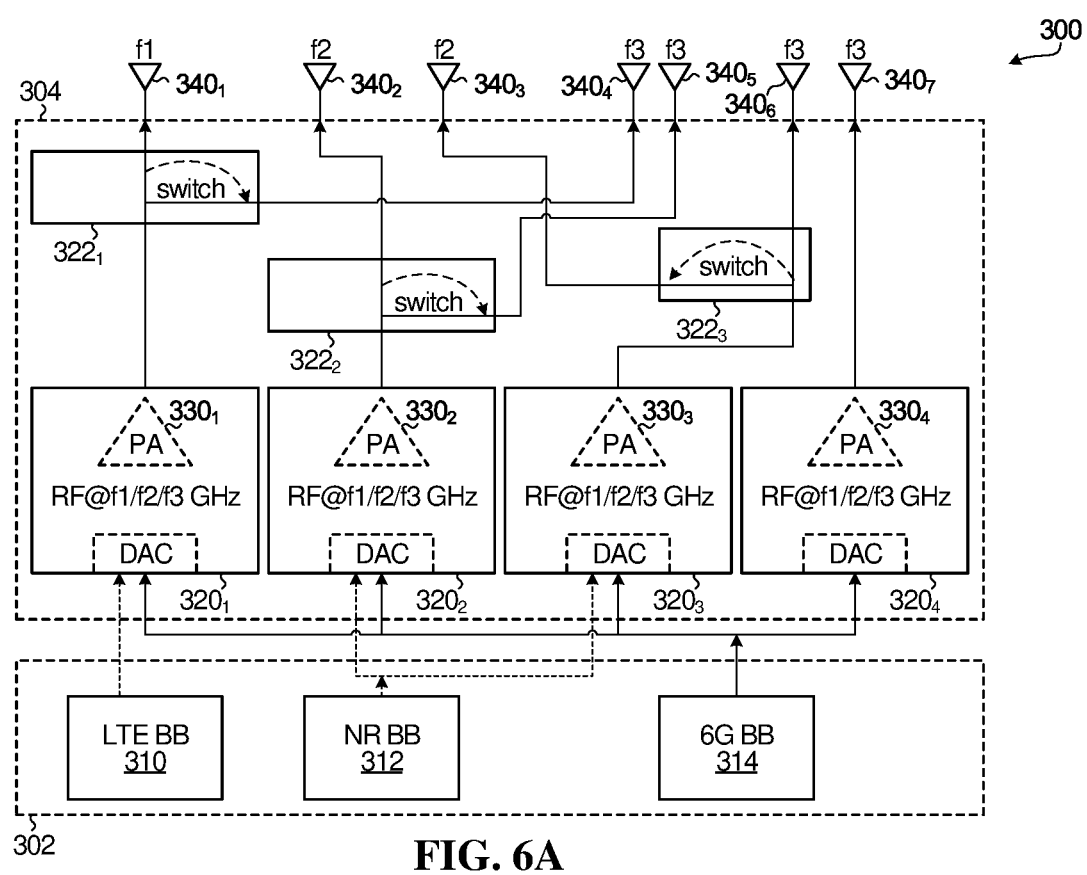
FIG. 6A illustrates an example of a multi-RAT transmitter architecture to support LTE, NR and 6G RATs in which RF transmitter chains are shared to support multiple transmissions (TXs)/component carriers (CCs), according to one embodiment.

FIG. 6A illustrates an example of a multi-RAT transmitter architecture to support LTE, NR and 6G RATs in which RF transmitter chains are shared to support multiple TXs/CCs, according to one embodiment. In particular, FIG. 6A shows a multi-RAT transmitter 300 that includes a baseband (BB) portion 302, an RF portion 304, and a plurality of physical antennas 340 that includes seven physical antennas $340_1$, $340_2$, $340_3$, $340_4$, $340_5$, $340_6$ and $340_7$.

Similar to the baseband portion 302 of the multi-RAT transmitter 300 shown in FIG. 5, The baseband portion 302 of the multi-RAT transmitter 300 shown in FIG. 6A includes a baseband module for each of the three supported RATs, namely LTE BB module 310, NR BB module 312 and 6G BB module 314.

However, in contrast to the RF portion 304 of the multi-RAT transmitter 300 shown in FIG. 5, which included seven RF modules that were each configured to operate in a given one of the frequency bands f1, f2 or f3, the RF portion 304 of the multi-RAT transmitter 300 shown in FIG. 6A includes four RF modules $320_1$, $320_2$, $320_3$ and $320_4$, each of which is operable in all three of the frequency bands f1, f2 and f3 and each of which is operably connected to obtain BB signals from 6G BB module 314. One of the four RF modules $320_1$, $320_2$, $320_3$ and $320_4$ is also operably connected to obtain BB signals from LTE BB module 310, for example the one RF module can be RF module $320_1$, as shown in FIG. 6A. Two of the four RF modules $320_1$, $320_2$, $320_3$ and $320_4$ are operably connected to obtain BB signals from NR BB module 312, for example the two RF modules can be RF modules $320_2$ and $320_3$, as shown in FIG. 6A.

Moreover, in further contrast to the RF portion 304 of the multi-RAT transmitter 300 shown in FIG. 5, each of the RF modules RF modules $320_1$, $320_2$, $320_3$ and $320_4$ of the RF portion 304 shown in FIG. 6A includes an integrated power amplifier $330_1$, $330_2$, $330_3$ and $330_4$, respectively, that is operable in the three frequency bands f1, f2 and f3. In addition, the RF portion 304 shown in FIG. 6A further includes three switches $322_1$, $322_2$ and $322_3$ that are operable to selectively switch outputs of the RF modules $320_1$, $320_2$, $320_3$ and $320_4$ to different antennas or sets of antennas among the seven physical antennas $340_1$, $340_2$, $340_3$, $340_4$, $340_5$, $340_6$ and $340_7$. In particular:

Switch $322_1$ is operable to selectively switch an RF output from RF module $320_1$ to either the physical antenna $340_1$, which is operable in frequency band f1, or to physical antenna $340_4$, which is operable in frequency band f3;

Switch $322_2$ is operable to selectively switch an RF output from RF module $320_2$ to physical antenna $340_2$ which is operable in frequency band f2, or to physical antennas $340_5$, which is operable in frequency band f3; and Switch $322_3$ is operable to selectively switch RF outputs from RF module $320_3$ to either physical antenna $340_3$, which is operable in frequency band f2, or physical antenna $340_6$, which is operable in frequency band f3.

In the embodiment shown in FIG. 6A, the RF modules $320_4$ is connected only to physical antenna $340_7$, which is only operable in frequency band f3, and therefore although the RF module $320_4$ may itself be operable in all three frequency bands f1, f2 and f3, the RF modules $320_4$ in this implementation can only be used for transmission in frequency band f3.

As noted above, in the embodiment shown in FIG. 6A each of the RF modules 320 is operable in all three of the frequency bands f1, f2 and f3. In other embodiments, one or more of the RF modules may support less than all of the frequency bands. For example, in an alternative embodiment of the RF portion 304 of the multi-RAT transmitter 300 shown in FIG. 6A, each of the RF modules 320 may only be operable in the frequency band(s) of the physical antenna(s) 340 to which they are or can be operably connected via the switches 322. For example, in one embodiment the RF module $320_1$ may be operable in the frequency bands f1 and f3, the RF module $320_2$ may be operable in the frequency bands f2 and f3, the RF module $320_3$ may be operable in the frequency bands f2 and f3, and the RF module $320_4$ may be operable in the frequency band f3. In such an embodiment, all the RF modules $320_1$, $320_2$, $320_3$ and $330_4$ may still include an integrated power amplifier $330_1$, $330_2$, $330_3$ and $330_4$, respectively, but the power amplifier $330_1$ may be operable in the frequency bands f1 and f3, both of the power amplifiers $330_2$ and $330_3$ may be operable in the frequency band f2 and f3, and the power amplifier $330_4$ may be operable in the frequency band f3.

In this embodiment, the RF modules $370_1$ to $370_4$, which include integrated multi-band power amplifiers $330_1$ to $330_4$, respectively, each implement an RF transmitter chain of the multi-RAT transmitter 300. In particular, each RF module 370 is operable to obtain a digital baseband signal and generate a corresponding RF signal in frequency band f1/f2/f3 that is ready for transmission via one or more of the physical antennas 340. Switches 322 are operable to selectively connect the RF signal outputs of the RF transmitter chains implemented by the RF modules 320 to one or more of the antennas 340 as described above. This configuration allows the three RATs, namely LTE, NR and 6G, to share the available RF transmitter chains and also allows 6G multiple MIMO layers/CCs.

In contrast to the Multi-RAT transmitter 300 shown in FIG. 5, by sharing RF transmitter chains among the three RATs rather than having one or more dedicated RF transmitter chains for each RAT, the number of RF chains can be significantly reduced from 7 to 4.

In accordance with one aspect of the present disclosure, a UE or other apparatus having the architecture shown in FIG. 6A will report the following RF capability information to a network device, e.g., T-TRP 170 or NT-TRP 172, based on the architecture shown in FIG. 6A:

The number of transmit chains reported by UE in total for the broad frequency range covering at least the three frequency bands f1, f2, f3: 4

The number of physical antennas reported for f1: 1

The number of physical antennas reported for f2: 2

The number of physical antennas reported for f3: 4

As a result, there are at least following multi-transmission choices supported by this architecture:

CA for 6G: 4 CCs with 1 TX per CC;

MIMO for 6G: up to 4 layers for f3; up to 2 layers for f2; 1 layer for f1

In some embodiments, the RF capability information reported by a UE or other apparatus may also or instead include RF receiver capability information. For example, in some embodiments the RF capability information reported by a UE or other apparatus may also or instead include:

RF receiver chain information indicating the number of RF receiver chains for a large third frequency range; and Antenna information indicating the number of physical antenna(s) per narrow fourth frequency range with the large third frequency range.

In some embodiments, the reported number of RF receiver chains may be shared among multiple RATs supported by the UE, e.g., among LTE, NR, 6G, etc.

The large first frequency range for which a UE may report RF transmitter capability information may be the same as or different from the large third frequency range for which the UE may report RF receiver capability information. In some embodiments, if the two large frequency ranges are the same, then only one of the first frequency range and the third frequency range may be defined in a standard specification for one or more of the RATs supported by the UE. Alternatively, if the first frequency range and the third frequency range are different, then both the first frequency range and the third frequency range may be defined in the standard specification.

For example, the large third frequency range may be FR1 or FR2 as defined in Table 5.1-1 of TS 38.101-1, which was reproduced above.

More generally, the large third frequency range may be any frequency range that an RF receiver chain (e.g., including LNA, ADC, IF etc, not including antennas) can switch within or work within.

In some embodiments, the number of RF receiver chains reported by a UE or other apparatus are shared among multiple RATs that the UE supports, e.g., LTE, NR, 6G etc., for reception in the large third frequency range.

The narrow fourth frequency ranges within the large third frequency range may be the operating bands or band combinations as defined in TS 38.101-1 or TS 36.101, for example. More generally, the narrow fourth frequency ranges may be any frequency range a physical antenna is operable to work for, i.e., in which the antenna is operable to meet given performance requirements.

Figure 6B:
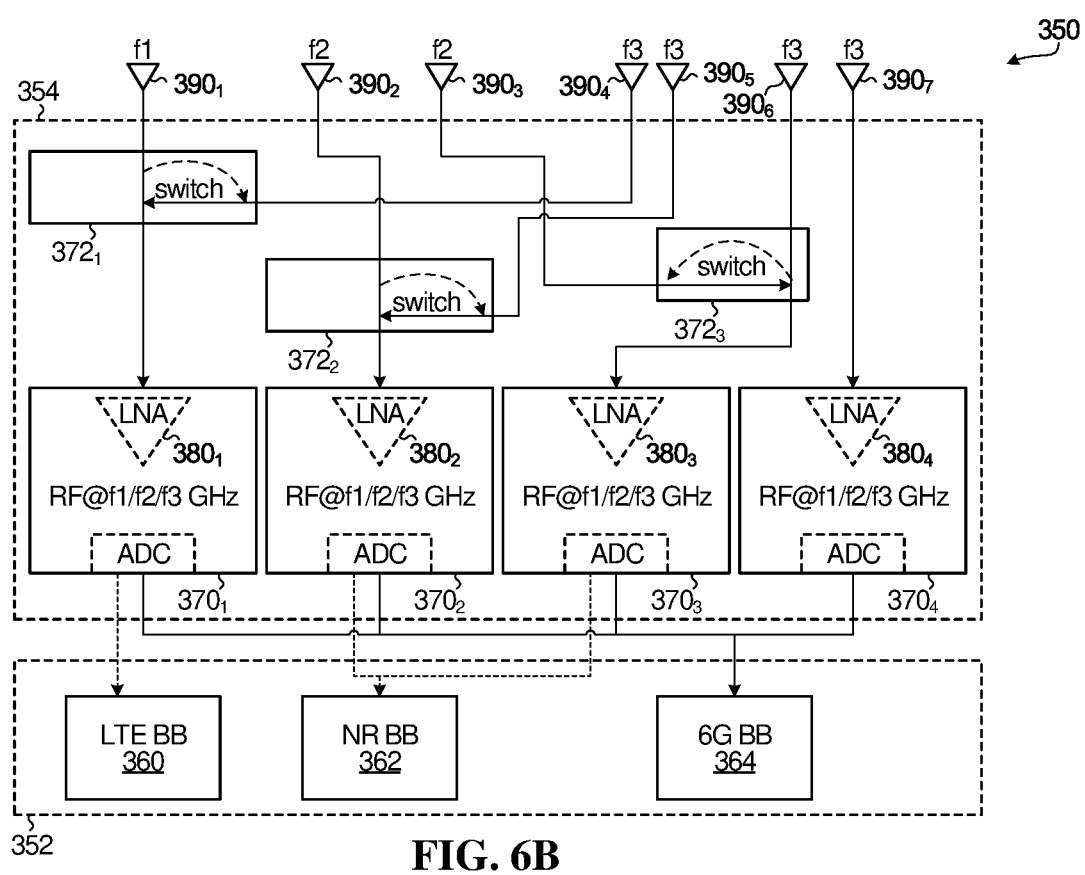
FIG. 6B illustrates an example of a multi-RAT receiver architecture to support LTE, NR and 6G RATs in which RF receiver chains are shared to support multiple receptions (RXs)/CCs, according to one embodiment.

FIG. 6B illustrates an example of a multi-RAT receiver architecture to support LTE, NR and 6G RATs in which RF receiver chains are shared to support multiple receptions (RXs)/CCs, according to one embodiment. In particular, FIG. 6B shows a multi-RAT receiver 350 that includes a baseband (BB) portion 352, an RF portion 354, and a plurality of physical antennas 390 that includes seven physical antennas $390_1$, $390_2$, $390_3$, $390_4$, $390_5$, $390_6$ and $390_7$. One or more of the physical antennas 390 of the RF transmitter 350 shown in FIG. 6B may also be one of the physical antennas 340 of the RF transmitter 300 shown in FIG. 6A. That is, in some embodiments a physical antenna may be used for both transmitting and receiving (e.g., in a TDM or FDM duplexing manner). In other cases, an apparatus may have different sets of physical antennas for transmitting and receiving with no overlap between the sets.

The physical receiver antennas 390 are each configured for a particular frequency band. In particular, in this example, physical receiver antenna $390_1$ is configured for operation in a first frequency band f1, physical receiver antennas $390_2$ and $390_3$ are configured for operation in a second frequency band f2, and physical receiver antennas $390_4$, $390_5$, $390_6$ and $390_7$ are configured for operation in a third frequency band f3 for 6G. The frequency bands f1, f2 and f3 used for receiving signals may be the same as or different from the frequency bands f1, f2 and f3 used for transmitting signals.

The RF portion 354 of the multi-RAT receiver 350 includes three switches $372_1$, $372_2$ and $372_3$ and four RF receiver modules $370_1$, $370_2$, $370_3$ and $370_4$, each of which is operable in all three of the frequency bands f1, f2 and f3.

The three switches $372_1$, $372_2$ and $372_3$ are operable to selectively switch RF signals from the seven physical antennas $390_1$, $390_2$, $390_3$, $390_4$, $390_5$, $390_6$ and $390_7$ to the RF modules $370_1$, $370_2$, $370_3$ and $370_4$. In particular:

Switch $372_1$ is operable to selectively switch either RF signals from physical antenna $390_1$, which is operable in frequency band f1, or RF signals from physical antenna $390_4$, which is operable in frequency band f2, to the RF module 370;

Switch $372_2$ is operable to selectively switch either RF signals from physical antenna $390_2$, which is operable in frequency band f2, or RF signals from physical antenna $390_5$, which is operable in frequency band f3, to the RF module $370_2$; and Switch $372_3$ is operable to selectively switch either RF signals from physical antenna $390_6$, which is operable in frequency band f3, or RF signals from physical antenna $390_3$, which is operable in frequency band f2, to the RF module $370_3$.

The RF modules 370 include signal processing functions needed to convert RF signals into digital baseband signals that are ready to be processed by the baseband modules 310, 312, 314. For example, each of the RF modules RF modules $370_1$, $370_2$, $370_3$ and $370_4$ of the RF portion 354 shown in FIG. 6B includes an integrated low noise amplifier $380_1$, $380_2$, $380_3$ and $380_4$, respectively, that is operable in the three frequency bands f1, f2 and f3. In addition to low noise amplification, such signal processing functions may include RF to IF conversion, IF to baseband conversion, analog to digital conversion (ADC), for example. In this way, each RF module 370 functions as an RF receiver chain that receives RF signals and generates corresponding digital baseband signals ready for baseband processing in the baseband portion 352 of the multi-RAT receiver 350.

The baseband portion 352 includes a baseband module for each of the three supported RATs, namely LTE BB module 360, NR BB module 362 and 6G BB module 364. In this embodiment, each of the four RF receiver modules $370_1$, $370_2$, $370_3$ and $370_4$ is operably connected to provide digital baseband signals to 6G BB module 354, which means that the 6G BB module 354 can potentially obtain digital baseband signals corresponding to the RF signals received via any of the physical antennas $390_1$ to $390_7$ through any of the RF modules $370_1$ to $370_4$ depending on the selective switching implemented by the switches 372. This configuration allows the three RATs, namely LTE, NR and 6G, to share the available RF receiver chains implemented by the four RF modules $370_1$ to $370_4$, and also allows the 6G BB module 364 to receive multiple MIMO layers/CCs.

In accordance with one aspect of the present disclosure, a UE or other apparatus having the multi-RAT receiver architecture shown in FIG. 6B will report RF capability information to a network device, e.g., T-TRP 170 or NT-TRP 172, that includes the following RF receiver capability information based on the architecture shown in FIG. 6B The number of receiver chains reported by UE in total for the broad frequency range covering at least the three frequency bands f1, f2, f3: 4

The number of physical antennas reported for f1: 1

The number of physical antennas reported for f2: 2

The number of physical antennas reported for f3: 4

As a result, there are at least following multi-reception choices supported by this architecture:

CA for 6G: 4 CCs with 1 RX per CC;

MIMO for 6G: up to 4 layers for f3; up to 2 layers for f2; 1 layer for f1.

Referring again to FIGS. 6A and 6B, it can be seen that by sharing RF transmitter chains and/or RF receiver chains among multiple RATs, the number of RF chains can be reduced.

Figure 7:
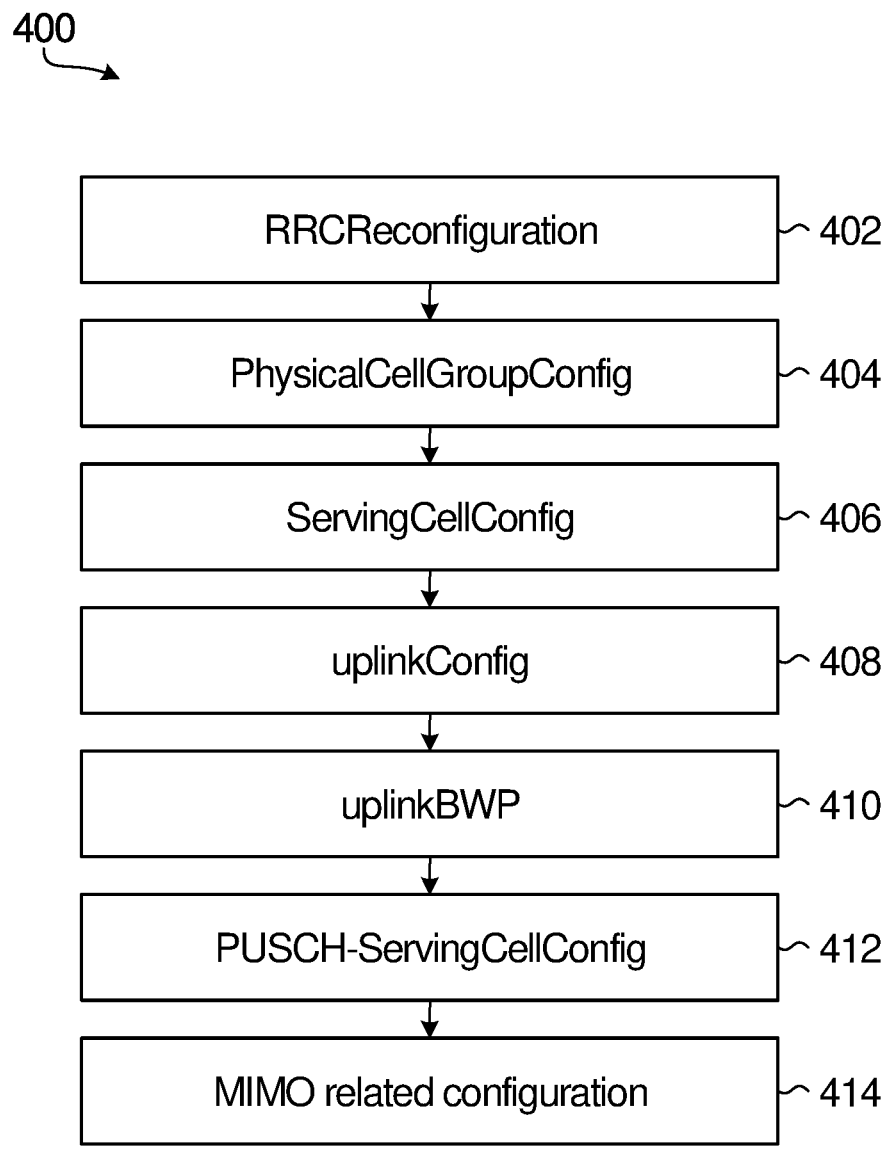
FIG. 7 illustrates an example of an existing radio resource control (RRC) signaling structure.

The current RRC signaling process in NR is shown at 400 in FIG. 7. The current RRC signaling process 400 has the following structure:

RRCReconfiguration 402→CellGroupConfig 404→ServingcCellConfig 406→uplinkConfig 408→uplinkBWP 410→PUSCH-ServingCellConfig 412→MIMO related configuration 414.

The current RRC signaling structure cannot support allocation of RF chains and/or antenna(s). As a result, dynamically switching between MIMO and CA, between M-TRPs and CA, and between MIMO and M-TRPs, from the UL/transmission link or DL/reception link perspective, cannot be supported by the current RRC signal process.

Another aspect of the present disclosure provides a control signaling design to allocate RF chains and/or antenna(s) among RATs based on the new RF capabilities reported by an apparatus in accordance with the embodiments described above.

Figure 8A:
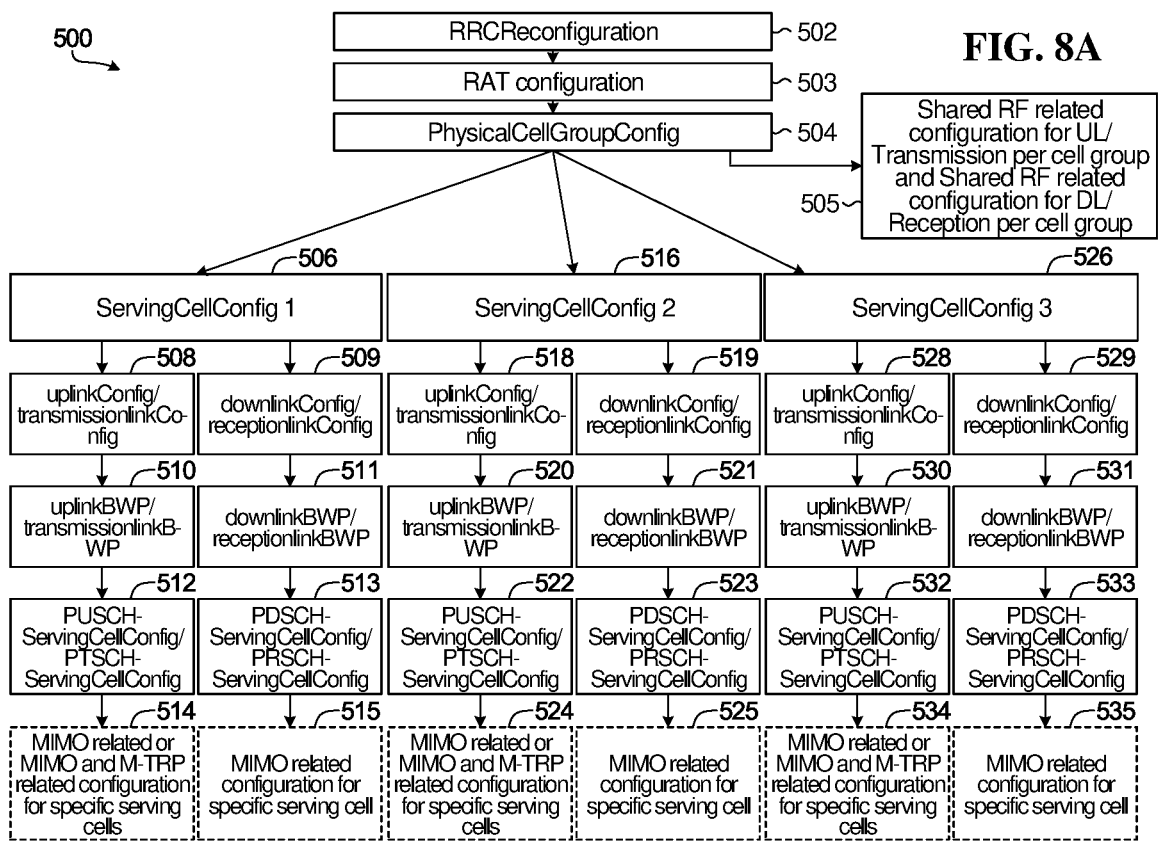
FIG. 8A illustrates an example of an RRC signaling structure that supports semi-static allocation of RF chains and/or antennas among multiple RATs and dynamic allocation of RF chains and/or antennas between different transmission modes supporting multiple TXs/CCs, according to one embodiment.

The signaling for allocating the RF chains and/or antenna(s) among RATs can be physical layer signaling, RRC signaling, or medium access control (MAC) control element (CE), etc In some embodiments, the signaling to allocate RF chains and/or antenna(s) among RATs is semi-static, but the allocation of RF chains and/or antenna(s) between CA and MIMO, between M-TRPs and CA, or between MIMO and M-TRPs, may be dynamically signaled. For example, FIG. 8A illustrates an example of an RRC signaling process 500 that supports semi-static allocation of RF chains and/or antennas among multiple RATs and dynamic allocation of RF chains and/or antennas between different transmission modes supporting multiple TXs/CCs, according to one embodiment in which there are three CCs. The RRC signaling process 500 has the following structure:

RRCReconfiguration 502→RAT configuration 503→CellGroupConfig 504 (comprising shared RF related configuration for UL/transmission link per cell group for a given RAT, and shared RF related configuration for DL/reception link per cell group for a given RAT, as indicated at 505; e.g., the shared RF related configuration can be the shared maximum number of transmitting MIMO layers and/or receiving MIMO layers per cell group for a given RAT; or The shared RF related configuration can be the shared number of RF transmitter chains per cell group for a given RAT; or The shared RF related configuration can be the shared number of RF receiver chains per cell group for a given RAT)→

ServingcCellConfig 1 506,
  (UL/transmission link)→uplinkConfig/transmission-linkConfig 508→uplinkBWP 510/transmissionlink BWP→PUSCH-ServingCellConfig/PTSCH (physical transmission link shared channel)-ServingCell-Config 512→MIMO related configuration and M-TRP related configuration or MIMO related configuration for a specific serving cell 515.
  (DL/reception link)→downlinkConfig 509→downlinkBWP/receptionlink BWP 511→PDSCH-ServingCellConfig/PRSCH (physical reception link shared channel)-ServingCellConfig 513→MIMO related configuration which includes M-TRP related configuration for a specific serving cell 515.

ServingcCellConfig 2 516,
  (UL/transmission link)→uplinkConfig/transmission-linkConfig 518→uplinkBWP/transmissionlink BWP 520→PUSCH-ServingCellConfig/PTSCH (physical transmission link shared channel) 522→MIMO related configuration and M-TRP related configuration, or MIMO related configuration for a specific serving cell 524.
  (DL/reception link)→downlinkConfig 519→downlinkBWP/receptionlinkBWP 521→PDSCH-ServingCellConfig/PRSCH (physical reception link shared channel)-ServingCellConfig 523→MIMO related configuration which includes M-TRP related configuration for a specific serving cell 525.

ServingCellConfig 3 526,
  (UL/transmission link)→uplinkConfig/transmission-linkConfig 528→uplinkBWP/transmissionlink BWP 530→PUSCH-ServingCellConfig/PTSCH (physical transmission link shared channel) 532→MIMO related configuration and M-TRP related configuration or MIMO related configuration for a specific serving cell 534.
  (DL/reception link)→downlinkConfig/reception-linkConfig 529→downlinkBWP/receptionlinkBWP 531→PDSCH-ServingCellConfig/PRSCH (physical reception link shared channel)-ServingCellConfig 533→MIMO related configuration which includes M-TRP related configuration for a specific serving cell 535.

It is noted that the allocations of RF chains and Antenna(s) are not explicitly mentioned in the signaling, rather the allocations are reflected in the configuration information that indicates, for a given RAT, the number of CC(s) and the max number of MIMO layers (transmitting MIMO layers and/or receiving MIMO layers) per CC. For example, in FIG. 8A the number of CC(s) is 3, and therefore there are three servingCellConfigs, namely ServingCellConfig 1 506, ServingCellConfig 2 516 and ServingCell Config 3 526. The number of servingCellConfig information element(s) (IE(s)) indicate the number of CCs, and the MIMO related configuration indicates the max number of layers per CC.

It is further noted that the uplinkConfig configuration information indicated at 508 and UplinkBWP configuration information indicated at 510 can be optional and therefore may not be included in some embodiments.

The MIMO related configuration for a specific serving cell at step 514, which can be optional, may include configuration information indicating the max number of MIMO layers for a specific serving cell (if the UE currently has at least one serving cell, which may not always be the case).

FIG. 8B illustrates another example of an RRC signaling process 500 that supports a semi-static allocation of RF chains and/or antennas among multiple RATs and a dynamic allocation of RF chains and/or antennas between different transmission modes supporting multiple TXs/CCs, according to one embodiment.

The embodiment shown in FIG. 8B differs from the embodiment shown in FIG. 8A in that the Physical Cell-GroupConfig information provided at 504 comprises a shared MIMO related configuration for more than one serving cell for a given RAT (indicated in the RAT configuration at 503), as indicated at 507. For example, the shared MIMO related configuration for more than one serving cell may include configuration information indicating the shared maximum number of MIMO layers for more than one serving cell for the given RAT.

The inclusion of the RAT configuration at 503, the shared MIMO related configuration information at 505 and the MIMO related configuration information for a specific serving cell (if one exists) at 514 in the RRC signaling processes 500 shown in FIGS. 8A and 8B enable the semi-static allocation of RF chains and/or antenna(s) among different RATs and the dynamic allocation of RF chains and/or antenna(s) between UL CA and MIMO, between M-TRPs and UL CA, or between UL MIMO and M-TRPs.

The foregoing control signaling design based on the new RF capability reporting disclosed herein provides several benefits in addition to those previously noted with respect to the new RF capability reporting. For example, the control signaling design described above can allow system throughput and UE perceived throughput to be balanced by dynamically switching or allocating RF chains and/or Antennas between UL CA and MIMO/M-TRPs. For example, configuring a UE for UL MIMO can contribute more throughput to the whole system than configuring the UE for UL CA due to the nature of the high spectrum efficiency of UL MIMO. Conversely, configuring a UE for UL CA provides more available frequency resources for the given UE than UL MIMO, thus the UE's perceived throughput is generally higher when configured for UL CA compared to if the UE is configured for UL MIMO. By dynamically switching a given UE between UL CA and UL MIMO/M-TRPs, the UE's needs for higher perceived throughput at certain times can be balanced against the goal of generally providing higher overall system throughput by configuring the UE for UL MIMO/M-TRPs.

Figure 9:
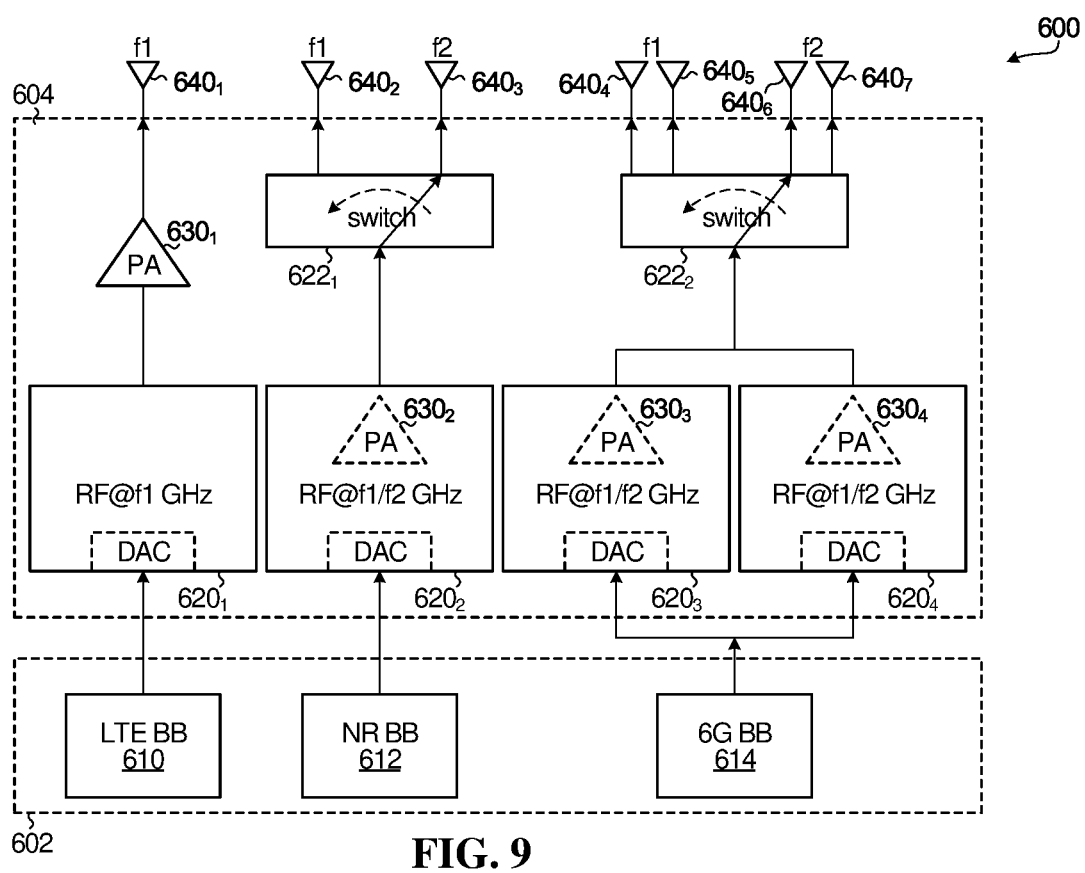
FIG. 9 illustrates an example of a multi-RAT transmitter architecture to support LTE, NR and 6G RATs in which RF transmitter chains for 6G are switched between two sets of antennas operable in different frequency bands to selectively support CA or MIMO in 6G, according to one embodiment.

FIG. 9 illustrates an example of a multi-RAT transmitter architecture to support LTE, NR and 6G RATs in which RF transmitter chains for 6G are switched between two sets of antennas operable in different frequency bands to selectively support CA or MIMO in 6G, according to one embodiment. In particular, FIG. 9 shows a multi-RAT transmitter 600 that includes a baseband (BB) portion 602, an RF portion 604, and a plurality of physical antennas 640 that includes seven physical antennas $640_1$, $640_2$, $640_3$, $640_4$, $640_5$, $640_6$ and $640_7$.

Similar to the baseband portion 302 of the multi-RAT transmitter 300 shown in FIG. 6, the baseband portion 602 of the multi-RAT transmitter 600 shown in FIG. 9 includes a baseband module for each of the three supported RATs, namely LTE BB module 610, NR BB module 612 and 6G BB module 614.

The RF portion 604 of the multi-RAT transmitter 600 includes four RF modules $620_1$, $620_2$, $620_3$ and $620_4$. The LTE BB module 610 is operably connected to the RF module $620_1$. The NR BB module 612 is operably connected to the RF module $620_2$. The 6G BB module 614 is operably connected to both the RF module $620_3$ and the RF module $620_4$.

Each of the RF modules $620_2$, $620_3$ and $620_4$ is operable in two frequency bands, f1 and f2, and includes an integrated power amplifier $630_2$, $630_3$ and $630_4$, respectively, that is operable in frequency band f1 and f2. However, the RF module $620_1$ is only operable in the frequency band f1, and in this example does not include an integrated power amplifier. Instead, the RF portion 604 of the multi-RAT transmitter 600 also includes a discrete power amplifier $630_1$ and an RF output of the RF module $620_1$ is operably connected to an RF input of the power amplifier $630_1$.

RF module $620_1$, power amplifier $630_1$ and physical antenna $340_1$ are configured for operation in the frequency band f1 for LTE. In other embodiments, an RF module that includes an integrated power amplifier operable in the frequency band f1 may be used instead of the RF module $620_1$ and separate power amplifier $630_1$.

In addition, the RF portion 604 further includes two switches $622_1$ and $622_2$. The switch $622_1$ is operable to selectively switch an RF output from the RF module $620_2$ to either physical antenna $640_2$, which is operable in the frequency range f1, or physical antenna $640_3$, which is operable in frequency range f2. Switch $622_3$ is operable to selectively switch RF outputs from RF module $620_3$ and RF module $620_4$ to either the pair of physical antennas $640_4$ and $640_5$, which are operable in the frequency range f1, or the pair of physical antennas $640_6$ and $640_7$, which are operable in frequency band f2.

In accordance with one aspect of the present disclosure, a UE or other apparatus having the architecture shown in FIG. 9 may report RF capability information for each RAT. For example, the reported capability of number of transmitter/receiver chains/Antenna(s) may be reported on a per RAT basis. For example, in some embodiments the following RF capability information based on the architecture shown in FIG. 9 may be reported:

The number of transmit chains reported for 6G: 2
The number of antennas reported for f1 for 6G: 2;
The number of antennas reported for f2 for 6G: 2.

As a result, there are at least following multi-transmission choices supported by this architecture for 6G:

CA for 6G: 2 CCs with 1 TX per CC;
MIMO for 6G: 1 CC (f1 or f2) with up to two layers.

As such, a UE or other apparatus that includes the multi-RAT RF transmitter 600 can be dynamically switched between UL CA and MIMO/M-TRPs for 6G UL transmission. As discussed earlier, system throughput and UE perceived throughput can be balanced by dynamically switching or allocating RF chains and/or Antennas between UL CA and MIMO/M-TRPs.

It is noted that this embodiment can work with the current RRC signaling process 500 shown in FIG. 7.

Figure 10:
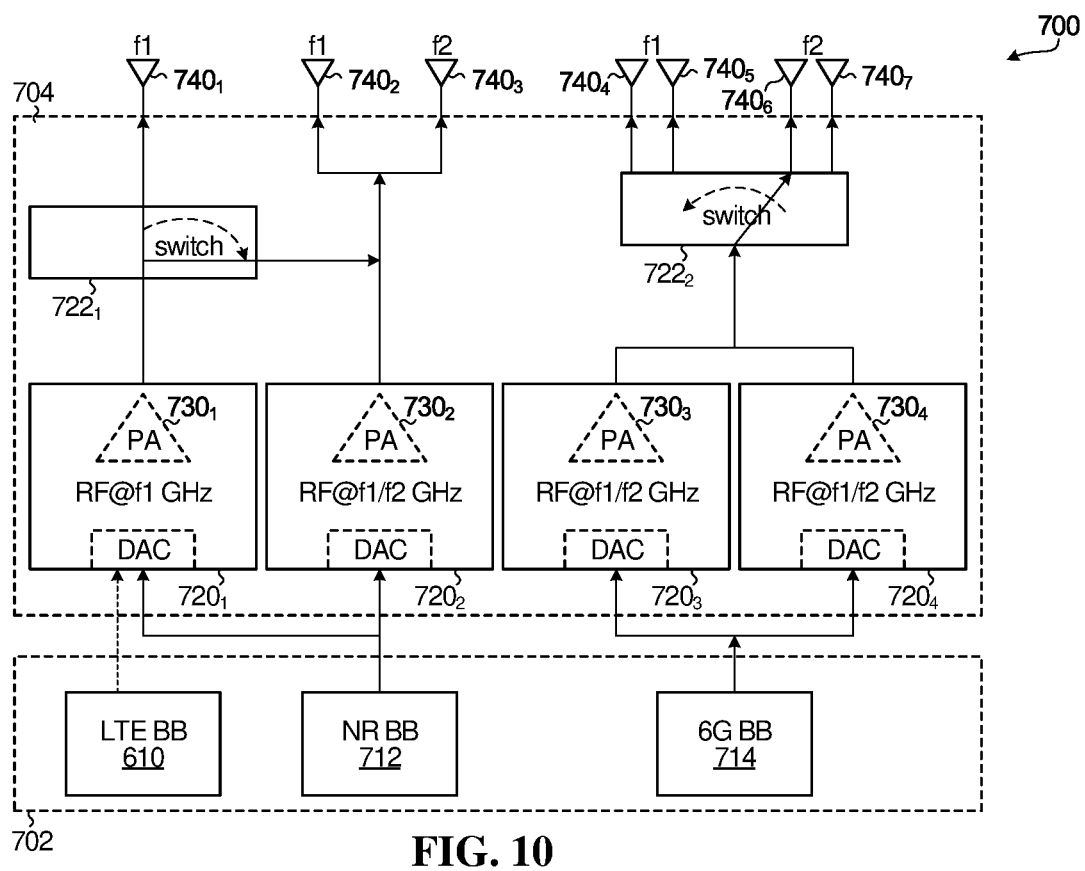
FIG. 10 illustrates an example of a multi-RAT transmitter architecture to support LTE, NR and 6G RATs in which RF transmitter chains for LTE and NR are shared to support NR and 6G dual connectivity (DC) with multiple TXs, according to one embodiment.

FIG. 10 illustrates another example of a multi-RAT transmitter architecture to support LTE, NR and 6G RATs, according to one embodiment. In this embodiment, RF transmitter chains for LTE and NR are shared to support NR and 6G dual connectivity (DC) with multiple TXs.

In particular, FIG. 10 shows a multi-RAT transmitter 700 that includes a baseband (BB) portion 702, an RF portion 704, and a plurality of physical antennas 740 that includes seven physical antennas $740_1$, $740_2$, $740_3$, $740_4$, $740_5$, $740_6$ and $740_7$.

Similar to the baseband portion 602 of the multi-RAT transmitter 600 shown in FIG. 9, the baseband portion 702 includes a baseband module for each of the three supported RATs, namely LTE BB module 710, NR BB module 712 and 6G BB module 714.

The RF portion 704 of the multi-RAT transmitter 700 includes four RF modules $720_1$, $720_2$, $720_3$ and $720_4$. The NR BB module 712 is operably connected to both the RF module $720_1$ and the RF module $720_2$. Similarly, the 6G BB module 714 is operably connected to both the RF module $720_3$ and the RF module $720_4$.

Each of the RF modules $720_2$, $720_3$ and $720_4$ is operable in two frequency bands, f1 and f2, and includes an integrated power amplifier $730_2$, $730_3$ and $730_4$, respectively, that is operable in frequency band f1 and f2. The RF module $720_1$ is only operable in the frequency band f1, and includes an integrated power amplifier $730_1$ that is operable in the frequency band f1.

RF module $720_2$ and physical antenna $740_2$ are configured for operation in the frequency band f1 for NR.

In addition, the RF portion 604 further includes two switches $722_1$ and $722_2$. The switch $722_1$ is operable to selectively switch an RF output from the RF module $720_1$ to either physical antenna $740_1$, which is operable in the frequency range f1, or the physical antennas $740_2$, which are operable in frequency ranges f1. Switch $622_3$ is operable to selectively switch RF outputs from RF module $720_3$ and RF module $720_4$ to either the pair of physical antennas $740_4$ and $740_5$, which are operable in the frequency range f1, or the pair of physical antennas $740_6$ and $740_7$, which are operable in frequency band f2; or one of the pair of physical antennas $740_4$ and $740_5$, and one of the pair of physical antennas $740_6$ and $740_7$.

In accordance with one aspect of the present disclosure, a UE or other apparatus having the architecture shown in FIG. 10 may report RF capability information for each RAT. For example, in some embodiments the following RF capability information based on the architecture shown in FIG. 10 may be reported:

The number of transmit chains reported for 6G: 2
The number of antennas reported for f1 for 6G: 2;
The number of antennas reported for f2 for 6G: 2.
The number of transmit chains reported for NR: 2
The number of antennas reported for f1 for NR: 2;
The number of antennas reported for f2 for NR: 1.

A key point of this embodiment is that DC with NR and 6G is supported, and both NR and 6G in the DC scheme can support up to two layers without requiring more than four RF transmitter chains.

In some embodiments, a UE or other apparatus that includes the multi-RAT RF transmitter 700 and has reported the above RF capability information for NR and 6G, and may further report support for DC between NR and 6G.

The architecture of the multi-RAT RF transmitter 700 supports the following configurations of DC between NR and 6G:

6G branch: One of following choices:
CA for 6G: 2 CCs with 1 TX per CC;
MIMO for 6G: 1 CC (f1 or f2) with up to two layers
NR branch: One of following choices:
CA for 5G: 2 CCs with 1 TX per CC;
MIMO for 5G: 1 CC (only f1) with up to two layers As such, a UE or other apparatus that includes the multi-RAT RF transmitter 700 can be dynamically switched between UL CA and MIMO/M-TRPs for 6G UL transmission similar to a UE that includes the multi-RAT RF transmitter 600 shown in FIG. 9. However, the architecture of the multi-RAT RF transmitter 700 further allows DC between NR and 6G without increasing the number of RF transmitter chains. As such, the UE cost to support DC between NR and 6G can be reduced by reusing the transmitter chain $720_1$ that otherwise was dedicated to another RAT (LTE in this example).

Example Methods

Figure 11:
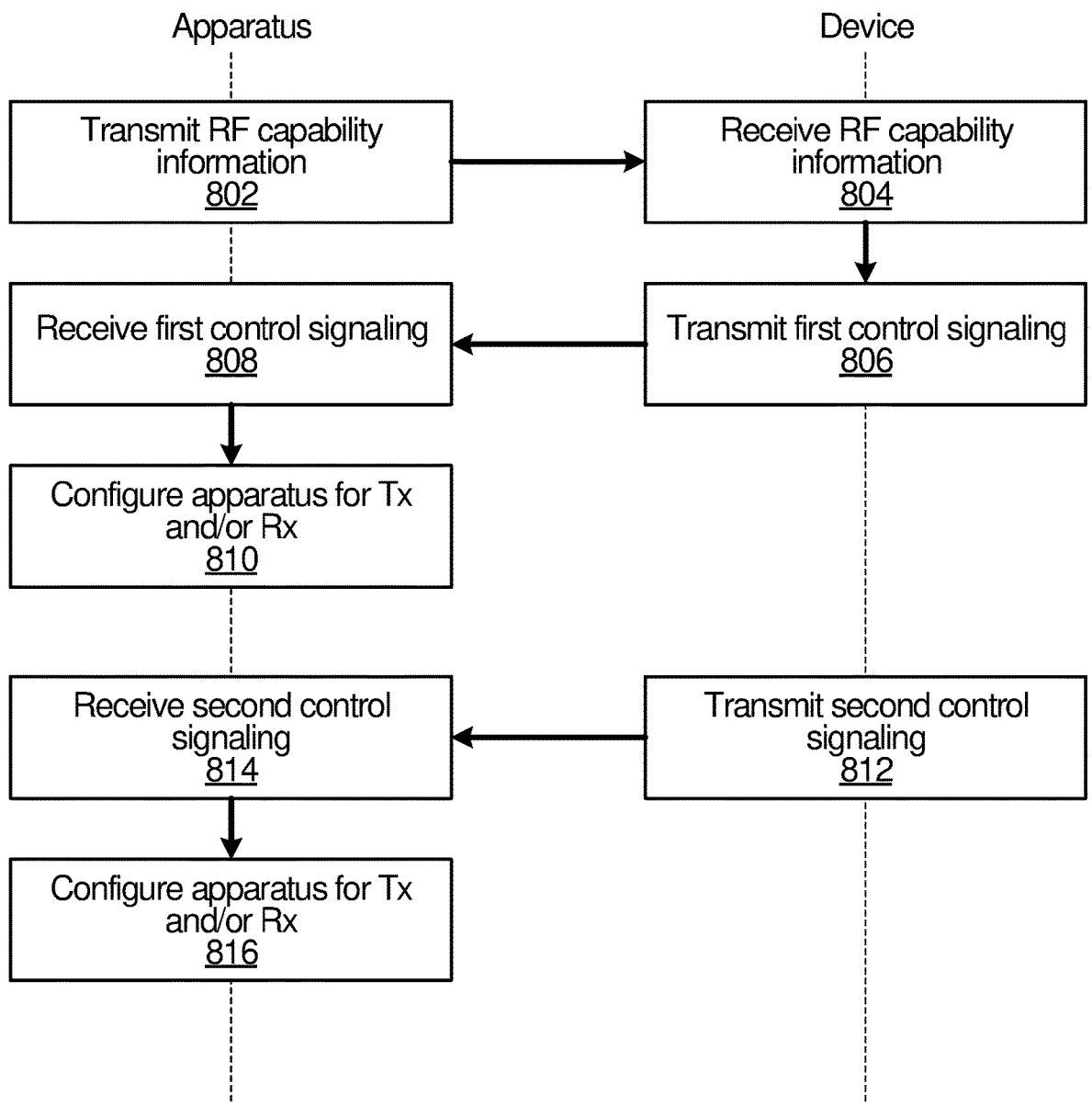
FIG. 11 illustrates an example of a method performed by a device and an apparatus, according to one embodiment.

FIG. 11 illustrates an example of a method performed by an apparatus and a device, according to one embodiment. The apparatus may be an ED 110, e.g., a UE, although not necessarily. The device may be a network device, e.g. TRP 170. However, the device may instead be a user equipment.

At step 802, the apparatus transmits RF capability information to the device. The RF capability information may include at least RF transmitter chain information and antenna information as described earlier. For example, the RF transmitter chain information may indicate a number of RF transmitter chains of the apparatus operable in a first frequency range, and the antenna information may indicate, for each second frequency range of a plurality of second frequency ranges within the first frequency range, a number of physical antennas, among a plurality of physical antennas of the apparatus, operable for transmission within the corresponding second frequency range.

In some embodiments, the plurality of second frequency ranges includes frequency bands or frequency band combinations defined in one or more of the RATs supported by the apparatus.

In some embodiments, the RF capability information may further include RF receiver chain information indicating a number of RF receiver chains of the apparatus operable in a third frequency range.

In some embodiments, the RF receiver chain information may include RAT-specific RF receiver chain information that, for one or more RATs of the plurality of RATs supported by the apparatus, indicates a number of RF receiver chains of the apparatus operable for receiving in accordance with the corresponding RAT in the third frequency range. In such embodiments, the antenna information may include RAT-specific receiver antenna information that, for one or more RATs of the plurality of RATs supported by the apparatus, indicates, for one or more of the fourth frequency ranges within the third frequency range, a number of physical antennas operable for receiving in accordance with the corresponding RAT within the corresponding fourth frequency range.

In some embodiments, the antenna information further indicates, for each fourth frequency range of a plurality of fourth frequency ranges within the third frequency range, a number of physical antennas, among the plurality of physical antennas of the apparatus, operable for receiving within the corresponding fourth frequency range.

In some embodiments, the first frequency range and the third frequency range are a same frequency range. In other embodiments, the first frequency range and the third frequency range are different.

In some embodiments, the RF transmitter chain information indicates a total number of RF transmitter chains of the apparatus that are operable in the first frequency range.

In some embodiments, the RF transmitter chain information indicates a total number of RF transmitter chains of the apparatus that are operable in the first frequency range per RAT.

In some embodiments, the RF transmitter chains included in the total number of RF transmitter chains of the apparatus that are operable in the first frequency range are shared among the plurality of RATs supported by the apparatus, such that one or more of the RF transmitter chains included in the total number of RF transmitter chains is selectively operable for use in generating transmissions in accordance with two or more of the RATs.

In some embodiments, the RF transmitter chain information may include RAT-specific RF transmitter chain information that, for one or more RATs of the plurality of RATs supported by the apparatus, indicates a number of RF transmitter chains of the apparatus operable for transmission in accordance with the corresponding RAT in the first frequency range. In such embodiments, the antenna information may include RAT-specific transmitter antenna information that, for one or more RATs of the plurality of RATs supported by the apparatus, indicates, for one or more of the second frequency ranges within the first frequency range, a number of physical antennas, among the plurality of physical antennas of the apparatus, operable for transmission in accordance with the corresponding RAT within the corresponding second frequency range.

In some embodiments, the plurality of RATs supported by the apparatus comprises at least two RATs, e.g., 5G NR and 6G.

At 804, the device receives the RF capability information. At 806, the device transmits first control signaling to the apparatus to configure the RF transmitter chains and/or the physical antennas of the apparatus. For example, based on the RF capability information reported by the apparatus, the device may determine that the apparatus is capable of supporting two or more multi-transmission configurations, such as CA, MIMO and/or M-TRP. For example, if the apparatus has a transmitter architecture corresponding to the transmitter architecture 300 shown in FIG. 6A, and the RF capability information received by the device at 804 indicates a total number of transmitter chains for the broad frequency range covering at least the three frequency bands f1, f2, f3 is 4, and a number of physical antennas for each of the three frequency bands f1, f2 and f3 is 1, 2 and 4, respectively (corresponding to the transmitter architecture 300 shown in FIG. 6A), then the device may determine the apparatus is at least capable of supporting CA for 6G utilizing 4 CCs with 1 TX per CC and MIMO for 6G utilizing up to 4 layers for f3; up to 2 layers for f2; and 1 layer for f1. Based on this, the device may choose a configuration for the apparatus with the goal of balancing system throughput and UE perceived throughput as described earlier. For example, configuring the apparatus for UL MIMO can contribute more throughput to the whole system than configuring the UE for UL CA due to the nature of the high spectrum efficiency of UL MIMO. Conversely, configuring the apparatus for UL CA provides more available frequency resources for the apparatus than UL MIMO, thus the apparatus' perceived throughput is generally higher when configured for UL CA compared to UL MIMO.

In some embodiments, the first control signaling comprises RAT-specific configuration information. For example, the RAT-specific configuration information may be for a first RAT of the plurality of RATs supported by the apparatus, e.g., 6G, and may indicate at least one of the following for the first RAT: a number of CCs and a maximum number of transmitting MIMO layers and/or receiving MIMO layers per CC within a physical cell group for the first RAT; a shared maximum number of transmitting multiple-input multiple-output (MIMO) layers and/or receiving MIMO layers for some or all the serving cells within a physical cell group for the first RAT; a shared number of RF transmitter chains and/or a shared number of RF receiver chains for some or all the serving cells within a physical cell group for the first RAT.

In some embodiments, the RAT-specific configuration information for the first RAT indicates any one of the following: the shared maximum number of transmitting MIMO layers and/or receiving MIMO layers for some or all the serving cells within the physical cell group for the first RAT; the shared number of RF transmitter chain and/or the shared number of RF receiver chain for some or all the serving cells within the physical cell group for the first RAT.

In such embodiments, the RAT-specific configuration information for the first RAT may further include serving cell-specific configuration information for a serving cell within the physical cell group for the first RAT. For example, the serving cell-specific configuration information may indicate a maximum number of transmitting MIMO layers and/or receiving MIMO layers for the serving cell.

In some embodiments, the first control signaling further includes RAT-specific configuration information for a second RAT of the plurality of RATs supported by the apparatus. For example, the RAT-specific configuration information for the second RAT may indicate at least one of the following: a number of CCs and a maximum number of transmitting MIMO layers and/or receiving MIMO layers per CC within a physical cell group for the second RAT; a shared maximum number of transmitting MIMO layers and/or receiving MIMO layers for some or all the serving cells within a physical cell group for the second RAT; a shared number of RF transmitter chain and/or a shared number of RF receiver chain for some or all the serving cells within a physical cell group for the second RAT.

In some embodiments, the RAT-specific configuration information for the first RAT and the RAT-specific configuration information for the second RAT may be in different information elements of the first control signaling.

At 808, the apparatus receives the first control signaling. At 810, the apparatus is configured for transmission and/or reception in accordance with the first control signaling.

By dynamically switching the apparatus between different multi-transmission modes that provide different levels of apparatus perceived throughput and overall system throughput, e.g., by dynamically switching the apparatus between UL CA and UL MIMO/M-TRPs, the device can balance the apparatus' needs for higher perceived throughput at certain times against the goal of generally providing higher overall system throughput. For example, if the first control signaling transmitted by the device at 806 initially configures the apparatus for UL CA (e.g., to serve the apparatus' need for higher throughput at that time), but the apparatus' need for the higher potential throughput provided by UL CA ends and/or is superseded by a need for greater overall system throughput, then in some embodiments at 812 the device may transmit second control signaling to re-allocate a shared number of RF transmitter chains and/or a shared number of RF receiver chains for some or all the serving cells within a physical cell group for the first RAT to perform any one or more of: CA transmission; MIMO transmission; or M-TRP transmission.

At 814, the apparatus receives the second control signaling. At 816, the apparatus is configured for transmission and/or reception in accordance with the second control signaling.

For example, in the above scenario in which the first control signaling may have configured the one or more RF transmitter chains and/or the one or more physical antennas for UL CA, the second control signaling may configure the apparatus to switch the one or more RF transmitter chains and/or the one or more physical antennas from CA transmission to MIMO transmission.

More generally, the second control signaling may configure the apparatus to switch the one or more RF transmitter chains and/or the one or more physical antennas at least from any one of: CA transmission to MIMO transmission; MIMO transmission to CA transmission; CA transmission to M-TRP transmission; M-TRP transmission to CA transmission; MIMO transmission to M-TRP transmission; or M-TRP transmission to MIMO transmission.

In some embodiments, the first control signaling may be one of radio resource control (RRC) signaling or medium access control (MAC) signaling.

In some embodiments, the second control signaling may be one of physical layer signaling or MAC signaling.

By performing the method of FIG. 11, the device (e.g., network device) has the ability to control the configuration of the apparatus (e.g., a UE) based on an awareness of the RF capability of the apparatus, which can, for example, allow the device to balance the throughput needs of the apparatus against overall system throughput needs.

Examples of devices (e.g. ED or UE and TRP or network device) to perform the various methods described herein are also disclosed.

For example, a first device may include a memory to store processor-executable instructions, and a processor to execute the processor-executable instructions. When the processor executes the processor-executable instructions, the processor may be caused to perform the method steps of one or more of the devices as described herein, e.g. in relation to FIG. 11. As one example, the processor may transmit RF capability information as described herein, and receive configuration signaling allocating RF chains and/or physical antennas between RATs and/or between CA and MIMO/M. For example, the processor may cause the device to communicate over an air interface in a mode of operation by implementing operations consistent with that mode of operation, e.g. performing necessary measurements and generating content from those measurements, as configured for the mode of operation, preparing uplink transmissions and processing downlink transmissions, e.g. encoding, decoding, etc., and configuring and/or instructing transmission/reception on RF chain(s) and antenna(s).

By applying the concepts disclosed herein, apparatus cost can potentially be reduced by sharing/reusing RF chains so that not every RAT has a dedicated set of RF chain(s) and/or a dedicated set of physical antenna(s). Moreover, in some embodiments, UE perceived throughput and system throughput can be balanced by dynamically switching between CA and MIMO/M-TRPs.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Definitions of Acronyms

NR New Radio
NR-U NR-based operations in Unlicensed Spectrum
LBT Listen before Talk
BWP Bandwidth part
CA Carrier aggregation
CB Code block
CBG Code block group
CCE Control channel element
CE Control element
CG Configuration grant
CRC Cyclic redundancy check
CSI Channel state information
DAI Downlink assignment index
DC Dual connectivity
DCI Downlink control information
DL Downlink
DL-SCH Downlink shared channel
EN-DC E-UTRA NR dual connectivity with MCG using E-UTRA and SCG using NR
FR Frequency region
gNB Next generation (or 5G) base station
HARQ-ACK Hybrid automatic repeat request acknowledgement
LTE Long Term Evolution
MAC Medium Access Control
MCG Master cell group
MCS Modulation and coding scheme
MIMO Multiple-Input Multiple-Output
MR-DC Multi-RAT Dual Connectivity
NR New Radio
OSI Other system information
PBCH Physical broadcast channel
PCell Primary cell
PDCCH Physical downlink control channel
PDSCH Physical downlink shared channel
PRACH Physical Random Access Channel
PRG Physical resource block group
PSCell Primary secondary cell
PSS Primary synchronization signal
PUCCH Physical uplink control channel
PUSCH Physical uplink shared channel
RACH Random access channel
RAPID Random access preamble identity
RAT Radio access technology
RB Resource block
RE Resource element
RF Radio frequency
RRM Radio resource management
RMSI Remaining system information
RS Reference signal
RSRP Reference signal received power
SCG Secondary cell group
SFN System frame number
SPS Semi-persistent scheduling
SR Scheduling request
SRI SRS resource indicator
SRS Sounding reference signal
SSS Secondary synchronization signal
TA Timing advance
TAG Timing advance group
UCI Uplink control information
UE User equipment
UL Uplink
UL-SCH Uplink shared channel

The invention claimed is:

1. A method performed by an apparatus that supports a plurality of radio access technologies (RATs), the apparatus comprising a plurality of radio frequency (RF) transmitter chains and a plurality of physical antennas, the method comprising:
   transmitting RF capability information, the RF capability information comprising:
      RF transmitter chain information indicating a number of RF transmitter chains of the apparatus operable in a first frequency range; and
      antenna information indicating, for each second frequency range of a plurality of second frequency ranges within the first frequency range, a number of physical antennas, among the plurality of physical antennas of the apparatus, operable for transmission within the corresponding second frequency range.

2. The method of claim 1, wherein the plurality of second frequency ranges comprises frequency bands or frequency band combinations defined in one or more of the RATs supported by the apparatus.

3. The method of claim 1, wherein the RF capability information further comprises:
RF receiver chain information indicating a number of RF receiver chains of the apparatus operable in a third frequency range.

4. The method of claim 3, wherein the antenna information indicates:
for each fourth frequency range of a plurality of fourth frequency ranges within the third frequency range, a number of physical antennas, among the plurality of physical antennas of the apparatus, operable for receiving within the corresponding fourth frequency range.

5. The method of claim 3, wherein the first frequency range and the third frequency range are a same frequency range.

6. The method of claim 1, wherein the RF transmitter chain information indicates a total number of RF transmitter chains of the apparatus that are operable in the first frequency range.

7. The method of claim 6, wherein the RF transmitter chains included in the total number of RF transmitter chains of the apparatus that are operable in the first frequency range are shared among the plurality of RATs supported by the apparatus, such that one or more of the RF transmitter chains included in the total number of RF transmitter chains is selectively operable for use in generating transmissions in accordance with two or more of the RATs.

8. The method of claim 6, wherein the plurality of RATs supported by the apparatus comprises at least two RATs.

9. The method of claim 1, wherein the RF transmitter chain information indicates a total number of RF transmitter chains of the apparatus that are operable in the first frequency range per RAT.

10. The method of claim 1, further comprising:
receiving first control signaling, wherein the first control signaling comprises RAT-specific configuration information for a first RAT of the plurality of RATs supported by the apparatus, the RAT-specific configuration information for the first RAT indicating at least one of the following:
a number of component carriers (CCs) and a maximum number of transmitting multiple-input multiple-output (MIMO) layers and/or receiving MIMO layers per CC within a physical cell group for the first RAT;
a shared maximum number of transmitting multiple-input multiple-output (MIMO) layers and/or receiving MIMO layers for some or all the serving cells within a physical cell group for the first RAT;
a shared number of RF transmitter chains and/or a shared number of RF receiver chains for some or all the serving cells within a physical cell group for the first RAT.

11. A method performed by a device, the method comprising:
receiving, from an apparatus, radio frequency (RF) capability information comprising:
RF transmitter chain information indicating a number of RF transmitter chains of the apparatus operable in a first frequency range; and antenna information indicating, for each second frequency range of a plurality of second frequency ranges within the first frequency range, a number of physical antennas operable for transmission within the corresponding second frequency range; and
transmitting, to the apparatus, first control signaling configuring the RF transmitter chains of the apparatus and/or the physical antennas of the apparatus.

12. The method of claim 11, wherein the first control signaling comprises RAT-specific configuration information for a first RAT, the RAT-specific configuration information for the first RAT indicating at least one of the following:
a number of component carriers (CCs) and a maximum number of transmitting multiple-input multiple-output (MIMO) layers and/or receiving MIMO layers per CC within a physical cell group for the first RAT;
a shared maximum number of transmitting multiple-input multiple-output (MIMO) layers and/or receiving MIMO layers for some or all the serving cells within a physical cell group for the first RAT;
a shared number of RF transmitter chains and/or a shared number of RF receiver chains for some or all the serving cells within a physical cell group for the first RAT.

13. The method of claim 12, wherein:
the RAT-specific configuration information for the first RAT indicates one of the following:
the shared maximum number of transmitting MIMO layers and/or receiving MIMO layers for some or all the serving cells within the physical cell group for the first RAT;
the shared number of RF transmitter chain and/or the shared number of RF receiver chain for some or all the serving cells within the physical cell group for the first RAT; and
the RAT-specific configuration information for the first RAT further comprises serving cell-specific configuration information for a serving cell within the physical cell group for the first RAT, the serving cell-specific configuration information indicating a maximum number of transmitting MIMO layers and/or receiving MIMO layers for the serving cell.

14. The method of claim 12, wherein the first control signaling further comprises RAT-specific configuration information for a second RAT, that the RAT-specific configuration information for the second RAT indicating one of the following:
a number of CCs and a maximum number of transmitting MIMO layers and/or receiving MIMO layers per CC within a physical cell group for the second RAT;
a shared maximum number of transmitting MIMO layers and/or receiving MIMO layers for some or all the serving cells within a physical cell group for the second RAT;
a shared number of RF transmitter chain and/or a shared number of RF receiver chain for some or all the serving cells within a physical cell group for the second RAT.

15. The method of claim 14, wherein the first RAT-specific configuration information for the first RAT and the RAT-specific configuration information for the second RAT are in different information elements of the first control signaling.

16. The method of claim 12, further comprising:
transmitting second control signaling allocating a shared number of RF transmitter chains and/or a shared number of RF receiver chains for some or all the serving cells within a physical cell group for the first RAT to perform any one or more of:

carrier aggregation (CA) transmission;

multiple-input multiple-output (MIMO) transmission; or multiple-transmit receive point (M-TRP) transmission.

17. The method of claim 16, wherein the second control signaling configures the apparatus to switch the one or more RF transmitter chains and/or the one or more physical antennas at least from any one of:

CA transmission to MIMO transmission;

MIMO transmission to CA transmission;

CA transmission to M-TRP transmission;

M-TRP transmission to CA transmission;

MIMO transmission to M-TRP transmission; or

M-TRP transmission to MIMO transmission.

18. The method of claim 16, wherein the second control signaling is one of physical layer signaling or medium access control (MAC) signaling.

19. The method of claim 11, wherein the first control signaling is one of radio resource control (RRC) signaling or medium access control (MAC) signaling.

20. An apparatus that supports a plurality of radio access technologies (RATs), the apparatus comprising:

a plurality of radio frequency (RF) transmitter chains;

a plurality of physical antennas;

a processor; and a memory storing processor-executable instructions that, when executed, cause the processor to:

transmit RF capability information, the RF capability information comprising:

RF transmitter chain information indicating a number of RF transmitter chains of the apparatus operable in a first frequency range; and antenna information indicating, for each second frequency range of a plurality of second frequency ranges within the first frequency range, a number of physical antennas, among the plurality of physical antennas of the apparatus, operable for transmission within the corresponding second frequency range.

* * * * *